(12) United States Patent
Long et al.

(10) Patent No.: US 11,966,868 B2
(45) Date of Patent: Apr. 23, 2024

(54) RAPID SORTING-BASED SUPPLY ASSIGNMENT TOOL FOR ORDER FULFILLMENT WITH SHORT SUPPLY

(71) Applicant: ORACLE INTERNATIONAL CORPORATION, Redwood Shores, CA (US)

(72) Inventors: Jing Long, Redwood City, CA (US); Randall B. Smith, Palo Alto, CA (US); Alan P. Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 314 days.

(21) Appl. No.: 16/879,219

(22) Filed: May 20, 2020

(65) Prior Publication Data

US 2021/0182755 A1    Jun. 17, 2021

Related U.S. Application Data

(63) Continuation-in-part of application No. 16/714,966, filed on Dec. 16, 2019, now Pat. No. 11,354,611.

(51) Int. Cl.
*G06Q 10/0631* (2023.01)
*G06F 3/0482* (2013.01)
(Continued)

(52) U.S. Cl.
CPC ......... *G06Q 10/06315* (2013.01); *G06F 7/08* (2013.01); *G06Q 10/04* (2013.01);
(Continued)

(58) Field of Classification Search
None
See application file for complete search history.

(56) References Cited

U.S. PATENT DOCUMENTS 7,610,212 B2 * 10/2009 Klett .................... G06Q 10/087
705/7.12
8,165,904 B2     4/2012 Srinivasan et al.
(Continued)

OTHER PUBLICATIONS

Li et al, A General Framework for Unmet Demand Prediction in On-Demand Transport Services, 2018 (Year: 2018).*
(Continued)

*Primary Examiner* — Mohamed N El-Bathy
(74) *Attorney, Agent, or Firm* — Kraguljac Law Group, LLC

(57) ABSTRACT

Systems, methods, and other embodiments for sorting-based assignment to optimize order fulfillment with short supply. One embodiment includes identifying a set of one or more distributions within a series of days. Sorting all demands of a first priority level occurring in the series of days by ascending order of size of the demand. For each demand of the first priority level in sorted order, (a) selecting an initial distribution during which the demand is scheduled to be fulfilled from the set of distributions, and (b) generating an indication that the demand can cannot be completely fulfilled, based on the size of the demand and the amount of supply available. Automatically arranging a graphical representation of a schedule of supplies and met and unmet demands for the series of days in a graphical user interface based at least on the indications generated for each demand.

20 Claims, 16 Drawing Sheets

(51) Int. Cl.
*G06F 7/08* (2006.01)
*G06Q 10/04* (2023.01)
*G06Q 10/0875* (2023.01)
*G06Q 10/10* (2023.01)

(52) U.S. Cl.
CPC . *G06Q 10/06312* (2013.01); *G06Q 10/06316* (2013.01); *G06Q 10/0875* (2013.01); *G06Q 10/10* (2013.01); *G06F 3/0482* (2013.01)

(56) References Cited

U.S. PATENT DOCUMENTS

| | | | |
|---|---|---|---|
| 8,447,644 B2 | 5/2013 | Nephew et al. | |
| 2002/0188499 A1* | 12/2002 | Jenkins | G06Q 10/087 705/28 |
| 2003/0208392 A1* | 11/2003 | Shekar | G06Q 10/06312 705/7.22 |
| 2004/0133458 A1* | 7/2004 | Hanrahan | G06Q 10/0631 705/7.12 |
| 2005/0097011 A1* | 5/2005 | Jain | G06Q 10/06 705/28 |
| 2009/0222312 A1* | 9/2009 | Degbotse | G06Q 10/087 705/28 |
| 2012/0072431 A1* | 3/2012 | Berlener | G06Q 30/06 707/E17.084 |
| 2013/0117162 A1 | 5/2013 | Feng et al. | |
| 2014/0095249 A1* | 4/2014 | Tarakad | G06Q 30/0633 705/7.25 |
| 2015/0379449 A1 | 12/2015 | Gopinath et al. | |
| 2017/0235436 A1* | 8/2017 | Hooton | G06F 3/04817 705/7.11 |
| 2017/0236082 A1 | 8/2017 | Davidson et al. | |
| 2017/0236083 A1 | 8/2017 | Granero et al. | |
| 2017/0236221 A1 | 8/2017 | Davidson et al. | |
| 2019/0238620 A1 | 8/2019 | Narayanam et al. | |
| 2019/0258979 A1 | 8/2019 | Mulay et al. | |
| 2020/0012983 A1 | 1/2020 | Wicker et al. | |
| 2020/0320474 A1* | 10/2020 | Hong | G06Q 10/0875 |
| 2020/0401994 A1* | 12/2020 | Kartoun | G06F 16/9035 |

OTHER PUBLICATIONS

Li et al., A General Framework for Unmet Demand Prediction in On-Demand Transport Services, Aug. 2019 (Year: 2019).*
Sinha et al., Enhancing operational efficiency of a container operator: A simulation optimization approach (Year: 2011).*
1st NF Office Action dated Sep. 15, 2021 for co-pending U.S. Appl. No. 16/714,966, filed Dec. 16, 2019.
Luo et al.; A Dynamic Vehicle Routing Problem for Responding to Large-Scale Emergencies; 2010 Intl. Conference on E-Business and E-Government; 2010; pp. 1-5.
Oracle Netsuite, Order Fulfillment, Feb. 26, 2020, (Copyright 2005, 2019), pp. 1-121, Redwood Shores, CA.

* cited by examiner

1150 →

CONTENTS OF THE "possibles" LIST possibles =

CONTENTS OF THE "metDemandsCandidates" LIST metDemandsCandidates =

RAPID SORTING-BASED SUPPLY ASSIGNMENT TOOL FOR ORDER FULFILLMENT WITH SHORT SUPPLY

CROSS REFERENCE TO RELATED APPLICATIONS

This disclosure claims the benefit of priority to U.S. patent application Ser. No. 16/714,966 filed Dec. 16, 2019, titled "MINIMIZING UNMET DEMANDS DUE TO SHORT SUPPLY", with inventor Randall B. Smith, and assigned to the present assignee, which is incorporated by reference herein in its entirety.

BACKGROUND

Operations management systems may include order fulfillment software that manages the task of matching supplies to demands. One such operations management system is Oracle® Netsuite®.

The components of the operations management system that manages the task of matching supplies to demands may be referred to herein as a "scheduling system," "assignment system," or "order fulfillment software." As referred to herein, a "supply" refers to a quantity of goods (or services) that is available for distribution, such as a shipment of the goods from a manufacturer, a completed production run of the goods, or goods on hand in inventory. A supply has both a size element that indicates the number of units of the item that is made available by the supply, and a time element that indicates when the supply becomes available for distribution. A "demand" refers to a request that a particular quantity of the goods be distributed, such as an order. A demand has both a size element that indicates the number of units of the item that required in order to meet the demand, and a time element that indicates when the demand should be met. In some situations, a demand may also have a priority element indicating a precedence in which the demand should be met in relation to other demands. While in some contexts, the term "order fulfillment" may include vehicle route planning for delivery, as used herein, the term "order fulfillment" refers to allocation of quantities of the supply to fulfill demands, for example by the scheduling system.

The available (in stock or on order) supply of goods is not always immediately adequate to satisfy the demands presented. Instead, the available supply must be allocated among the demands, with some demands possibly going unfulfilled. In some operations management systems, order fulfillment software does not automatically partially fill demands—partially filling a demand is not considered better than leaving a demand entirely unmet. Thus, if a demand can only be partially filled, the order fulfillment software will instead leave that demand entirely unmet and retain the unused supply for satisfying other demands.

"Eager" or "greedy" algorithms are those that make the locally optimal choice at each stage. Commonly, order fulfillment software "eagerly" assigns available supply to demands until all demands are fully met, or the available supply is exhausted. If there is not sufficient supply, some demands must be left unmet. Any unused supply is passed on to the next day, and may include supply that was saved by the policy of not partially filling a demand. Such eager approaches may be satisfactory when there is no shortage of supply, but in the face of a shortage of supply it may result in unnecessarily many unmet demands. For example, an eager order fulfillment method will not intentionally leave a demand unmet in order to fulfill two or more future demands.

In some situations, it is best to determine an order fulfillment allocation that fulfills as many demands as possible. Consider, as a simple example, a business that operates a distribution center warehouse that receives supplies of a single type of item, and allocates those supplies to various retail destinations by packing the items and shipping them directly from the warehouse to the retail destinations. In the context of the order fulfillment software, each requested shipment to a destination retail establishment may be considered a "demand." Presumably, the lost customer "good will" for unmet demands of the same priority is roughly similar regardless of demand size, shipping cost, order size, or any other concern. Further, each unmet demand may place an administrative burden on the business entity fulfilling the demand, such as communicating with the retail destinations (and or customers) whose orders are unmet. These costs may be simply measured by the number of unmet demands.

Given this model of cost (quantified by unmet demands) and "all-or-nothing" fulfillment, it can be better for the business entity to intentionally leave a large demand unmet today in order to fill several smaller demands of equal priority to the large demand tomorrow, even if the available supply is more than sufficient to meet the large demand. Also, when unmet demands are few in number, each can be handled as a special case: for example, they might be contacted to see if a later date or some way to split the order can be arranged. For such reasons, it is important to minimize the number of unmet demands.

But, approaches to matching supply to demand that do not act to minimize unmet demands can result in unnecessarily many unmet demands in the face of a supply shortage. This increases customer dissatisfaction due to unmet demands and puts additional burdens on a business to handle the unmet demands. But, it is difficult to rapidly analyze how best to allocate supply to demand to minimize unmet demands.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIG. 11B illustrates a simple example problem used for illustrating one embodiment of a process for finding multiple optimal solutions.

FIG. 11C illustrates one optimal solution (the initial optimal solution) to an example problem.

FIG. 11D illustrates contents of a map generated for an example problem.

FIG. 11E illustrates a list of all alternative sets of met demands that satisfy the same number of demands in each set of equal-size demands (the 'possibles' list) generated for an example problem.

FIG. 11F illustrates contents of a list of candidate equivalently optimal solutions (the 'metDemandsCandidates' list) generated for an example problem.

DETAILED DESCRIPTION

Figure 1:
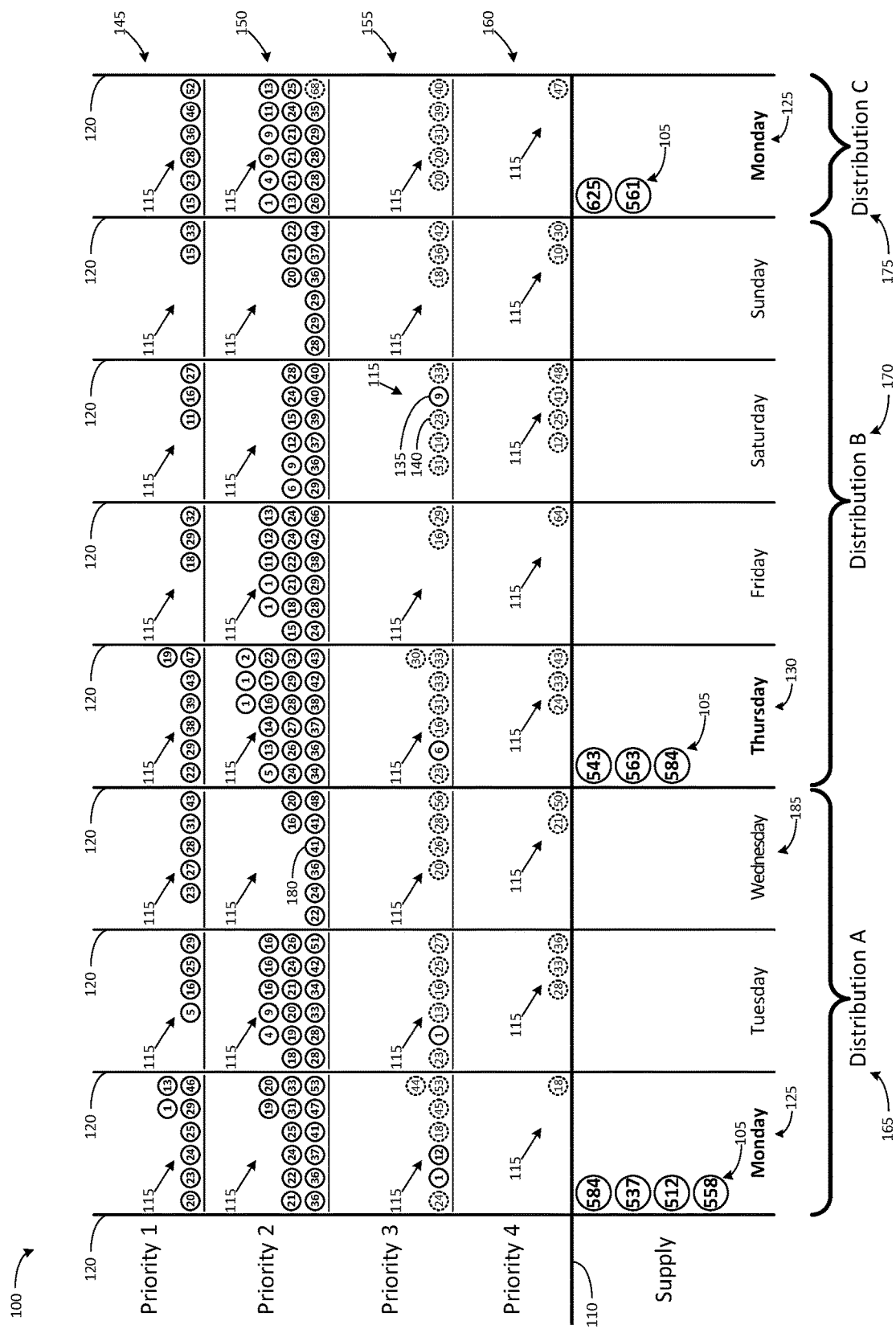
FIG. 1 illustrates one embodiment of a graphical user interface tool for representing and manipulating scheduled supplies and demands associated with sorting-based assignment to optimize order fulfillment with short supply.

Systems and methods are described herein that provide rapid sorting-based supply assignment for order fulfillment in short supply situations. The systems and methods described herein act to minimize unfilled demands (unfulfilled orders) due to short supply.

In one embodiment, a system and method to quickly find a minimal cost (counted in unfilled orders) assignment of incoming or available quantities of supply to a given set of demand quantities is presented herein. In one embodiment, that lowest cost assignment will be one of those with the greatest remaining supply. In one embodiment, the system and method is adapted to express constraints such as requiring a certain demand to be met or unmet. In one embodiment, the system and method identifies multiple optimal solutions, based on using the techniques described herein. Note that the available (in stock or on hand inventory, where the goods are currently in inventory) supply and incoming (on order or scheduled to be manufactured, where the goods are estimated to arrive in inventory at some time) supply may both be referred to herein as "available supply" for simplicity.

Leaving a demand unmet is generally undesirable. But, where (i) the cost of lost "good will" among unmet demands of the same priority is roughly similar; or (ii) where unmet demands may require special handling (the customer might be contacted to arrange for a different delivery date, or to work out a way to split or partially fill the order) it may be desirable to simply minimize the count of unmet demands, regardless of demand parameters, in order to minimize lost goodwill and/or special handling efforts. In the scheduling systems of some operations management systems, such as in Oracle's® NetSuite® cloud-based operations management system, leaving one demand of a certain priority unmet is presumed by the system to be the same as leaving any other demand of the same priority unmet, regardless of size, shipping cost, or any other attribute. Further, in some examples, the scheduling system does not automatically partially fill demands: if a demand can only be partially fulfilled, the scheduling system will instead leave that demand entirely unmet and retain the supply for future use. Given this "unmet demand" or "all or nothing" model of cost (based on instances of lost goodwill and/or instances of additional labor for special handling), it can be better for a business entity to intentionally leave a larger, earlier demand unmet in order to fill several smaller, later demands to reduce the number of unmet demands, even if the supply is more than sufficient to meet the larger, earlier demand.

Keeping unfilled demands to a minimum when there is insufficient supply to meet all demands eliminates the problems caused by unnecessarily unmet demands, such as reduced customer satisfaction, lost customer goodwill, and administrative cost. Also, when unmet demands are few in number, each unmet demand can be handled by a business as a special case: for example, the customer might be contacted to determine whether a later fulfillment date for an unmet demand is acceptable, or whether some split of the unmet demand can be arranged. For such reasons, it is important to minimize the number of unmet demands.

But, as discussed above, "eager" or "greedy" algorithms will not intentionally leave a larger demand unmet in order to fulfill two or more future smaller demands, permitting an excessive number of unmet demands. Instead, the systems and methods described herein intentionally bypasses fulfilling one demand when it determines that more demands can be met later by doing so.

The decision to intentionally neglect a demand is complex when those smaller demands are scattered among many demands of many sizes arriving over the coming weeks or even months, while other supplies are arriving as well. Keeping track of these scattered demands is itself beyond the ability of the human mind to practically perform. Further, making the decision to intentionally neglect any particular one of those demands, while fulfilling others, is even further beyond the practical ability of the human mind to perform. This is due at least to the volume of information, and also due to the constant change of information as new demands arrive. Operations management systems routinely feature dozens of supply arrivals and hundreds or even thousands of demands, which may change in real time during the course of an analysis. Thus, no action or function described or claimed herein is performed by the human mind. An interpretation that any action or function can be performed in the human mind is inconsistent and contrary to this disclosure.

The question arises: given a schedule of arriving supplies and arriving demands, what is the minimal cost (counted in unfilled orders) configuration matching the supplied units to demands? If there is sufficient supply to meet all demands the number of missed orders is zero when the system acts to minimize the number of unmet demands. In other words, the cost of matching supplied units to demands is simply a count of unmet demands. If the supply is fully sufficient to meet all demands, the task is trivial.

The problem becomes significant when there is a shortage. The problem is especially significant where customer schedules of the order fulfillment software routinely feature dozens of supply arrivals and hundreds or even thousands of demands. To minimize unfulfilled demands in the face of shortage, the system must determine what are the fewest demands that can be left unmet.

Determining a configuration of met and unmet orders for a given set of supplies and demands that is of minimal cost (in unmet orders) is combinatorically complex, and can take an unacceptably long time to complete, and use an unacceptably large amount of computing resources such as memory and processor cycles. This prevents timely user exploration of the effect of what-if scenarios adjustments on order fulfillment. These and other challenges are overcome by the systems and methods described herein, which present a rapid sorting-based supply assignment tool for order fulfillment in short supply situations.

—Example Order Fulfillment Tool—

FIG. 1 shows one embodiment of a tool 100 for representing and manipulating scheduled supplies and demands associated with sorting-based assignment to optimize order fulfillment with short supply. In one embodiment, the tool is a graphical user interface (GUI). The tool visually presents a schedule of met and unmet demands that minimizes unmet demands when available supply is insufficient to meet all scheduled demands. Schedules that minimize unmet demands may be referred to as an 'optimal' solution. The user can drag and drop to reschedule, delete, add, or otherwise manipulate demands and supplies to see virtually instantaneous changes in what are the optimal choices of demands to leave unmet if and when supply is not sufficient to fulfill all demands.

The tool 100 depicts an example eight day schedule of supplies and demands. In the tool, supplies are visually represented by the larger circles 105 below the central time line 110, and demands are visually represented by the smaller circles 115 above the time line 110. The supplies 105 and demands 115 for each day are divided from the supplies 105 and demands 115 of other days by vertical lines 120. We can see in this example that supply 105 shipments arrive on Mondays 125 and Thursdays 130.

In one embodiment, met demands and unmet demands are visually distinguishable from each other in the tool 100. For example, met demands are depicted by circles with a continuous outline, as shown by example met demand 135. Further, unmet demands are depicted by circles with a broken or dashed outline, as shown by example unmet demand 140. In another example, met and unmet demands may be distinguishable by color—met demands may be depicted with green-filled circles, unmet demands may be depicted using yellow-filled circles.

In one embodiment, each individual demand may have a fulfillment priority element associated with it, in addition to the time and size elements. Various numbers of priority levels may be selected, based on system requirements and user specifications. In one embodiment, the fulfillment priority element may have four possible values: priority 1, priority 2, priority 3, and priority 4, where priority 1 represents the highest priority orders, and priority 4 represents the lowest priority orders. In one embodiment, there may be any number N of priority levels. In a situation where there is a supply shortage, supply will be preferentially allocated by the scheduling system to higher priority orders over lower priority orders. Higher priority orders are thus met first, before lower priority orders are considered. For example, the Oracle® Netsuite® order fulfillment software includes such a prioritization scheme.

The tool 100 includes a visual representation of the fulfillment priority levels as priority bands or tiers across the visual representation of the timeframe. Priority 1 tier 145 includes visual representations (such as demand circles) of all demands associated with fulfillment priority 1. Priority 2 tier 150 includes visual representations of all demands associated with fulfillment priority 2. Priority 3 tier 155 includes visual representations of all demands associated with fulfillment priority 3. Priority 4 tier 160 includes visual representations of all demands associated with fulfillment priority 4. Note that as the fulfillment priority level descends, a higher and higher proportion of unmet orders appears in the example eight days of demands 115. This is appropriate in view of the level of fulfillment priority for each of the orders represented in the tool 100.

In one embodiment, the user can drag and drop demands and supplies among the various days to see virtually instantaneous changes in the optimal choices for unmet demands if and when supply is not sufficient. The drag and drop operation will automatically trigger operation of a method for determining and presenting (in the GUI) an optimal choice for unmet demands based on the new schedule indicated by the drag and drop operation.

In one embodiment, the user can also add (or delete) demands and supplies on the various days to see virtually instantaneous changes in the optimal choices for unmet demands if and when supply is not sufficient. The add (or delete) operation will trigger operation of an algorithm for determining and presenting (in the GUI) an optimal choice for unmet demands based on the new schedule indicated by the drag and drop operation.

Appearance of the visual representations of the supplies 105 and demands 115 in the tool 100 is performed automatically in response to the operation of a method for determining and presenting an optimal schedule of met and unmet demands for a set of demands and supplies. In one embodiment, one or more processors configured to implement the tool 100 are configured to automatically arrange the supplies or demands (and the visual representations of the supplies 105 or demands 115) for a given day in order (ascending or descending) of quantity. In one embodiment where there are multiple priority tiers, the processor(s) are configured to automatically arrange the supplies or demands (and the visual representations of the supplies 105 or demands 115) for a given day and priority tier in order (ascending or descending) of quantity. In one embodiment, the processor(s) are configured to automatically detect a new supply or new demand added to the system and automatically insert the new supply among existing supplies of the same day or insert the new demand among existing demands of the same day and priority tier, for example in order (ascending or descending) of quantity. In one embodiment, the processors automatically display a visual representation of the new supply or new demand among the visual representations of the supplies 105 or demands 115 for the same day and priority tier as the new supply or new demand. For example, the arrival of the new supply or new demand will automatically trigger operation of a method for determining and presenting (in the GUI tool 100) an optimal choice for unmet demands on a set of unmet demands that includes the new demand. Or for example, operation of a method for determining and presenting (in the GUI tool 100) an optimal schedule of met and unmet demands for a set of demands and supplies triggered by another event (such as user input to the tool 100) will automatically include the new demand.

Determining an optimal choice for unmet demands based on the schedule of demands and supplies bears some superficial similarity to the bin packing problem, but is fundamentally different due to the fact that each supply can only fill certain demands, and each demand can only be filled by certain supplies. However, the problem is a kind of "assignment problem," and it could be set up as a classic optimization task for some integer programming tool. But such programs can be slow, as the problem is combinatorically complex. Ideally, the software should be so fast that users can easily investigate "what if" scenarios by, for example, shifting supply arrival dates or speculating on arrival of future supplies or demands. For example, in the tool shown in FIG. 1, which is based on the techniques described herein, users can directly manipulate the supplies and demands to drag and drop them on different days, and the processor automatically updates the underlying information and automatically re-evaluates and displays an optimal schedule of met and unmet demands for the updated configuration of demands and supplies. When the user adds a new supply in the depicted situation, for example, the demands' continuous- or dashed-outline circles (or green and yellow colors) change virtually instantaneously, as an optimal solution can be found in a few milliseconds.

Slow programs are generally not suitable for the virtually instantaneous changes in the display of optimal schedules for met and unmet demands for this tool. For comparison, the situations of similar size to those depicted in FIG. 1 were evaluated using both (i) a classic integer programming technique, and (ii) the techniques described herein on the same hardware. In the test runs, the classic integer programming technique was hundreds or thousands of times slower than the techniques described herein. Thus, these substantially real-time operations for "what-if" exploration and for including new demands and new sources of supply are each enabled by the more rapid operation and reduced compute resource requirements of the systems and methods described herein.

In general, there may be multiple configurations with the smallest cost (fewest unmet demands). Technically any one of these configurations would serve as an answer to this assignment problem. Accordingly, in one embodiment, the methods described herein provide at least one such minimal cost configuration. But, the multiple optimal configurations will typically differ in the amount of supply left over. As a secondary benefit, in one embodiment, the systems and methods described herein provide that subset of lowest cost configurations that has the greatest remaining supply.

—Example Method for Sorting-Based Assignment—

In one embodiment, each step of computer-implemented methods described herein may be performed by a processor (such as processor 1510 as shown and described with reference to FIG. 15) of one or more computing devices (i) accessing memory (such as memory 1515 and/or other computing device components shown and described with reference to FIG. 15) and (ii) configured with logic to cause the system to execute the step of the method (such as Short Supply Sorting-Based Assignment Order Fulfillment Optimization Logic 1530 shown and described with reference to FIG. 15). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing any data calculated, determined, generated, classified, or otherwise created. References to storage or storing indicate storage as a data structure in memory or storage/disks of a computing device (such as memory 1515, or storage/disks 1535 of computing device 1505 or remote computers 1565 shown and described with reference to FIG. 15).

In one embodiment, each subsequent step of a method commences in response to parsing a signal received or stored data retrieved indicating that the previous step has been performed at least to the extent necessary for the subsequent step to commence. Generally, the signal received or the stored data retrieved indicates completion of the previous step.

Figure 2:
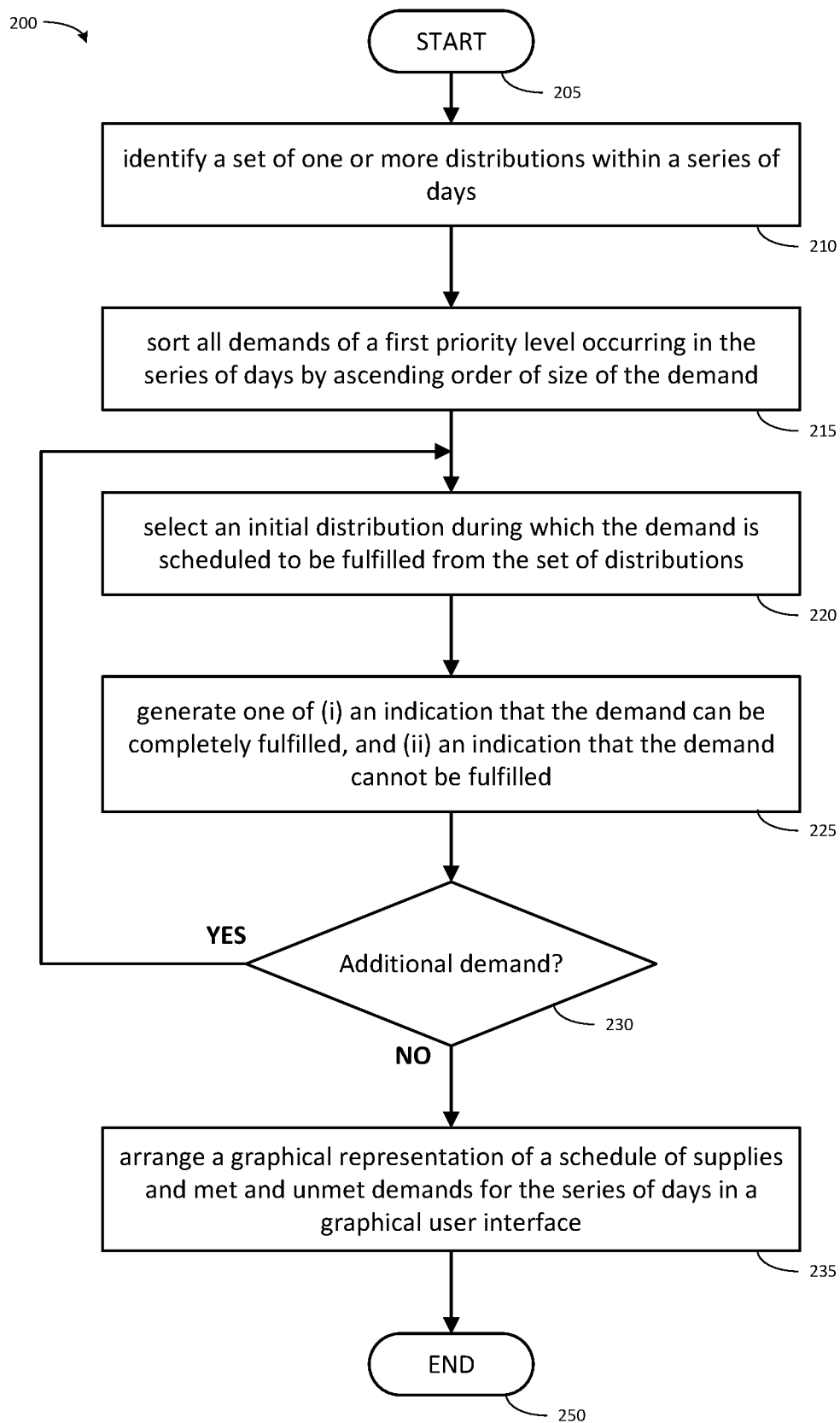
FIG. 2 illustrates one embodiment of a method associated with sorting-based assignment to optimize order fulfillment in short supply situations.

FIG. 2 illustrates one embodiment of a method 200 associated with sorting-based assignment to optimize order fulfillment in short supply situations. In one embodiment, the steps of method 200 are performed by Sorting-Based Fulfillment Optimization server/module 1295 (as shown and described with reference to FIG. 12). In one embodiment, Sorting-Based Fulfillment Optimization server/module 1295 is a special purpose computing device (such as computing device 1505) configured with Short Supply Sorting-Based Assignment Order Fulfillment Optimization Logic 1530. The method 200 may be referred to herein as the sorting-based fulfillment optimization method 200.

The method 200 may be initiated based on various triggers, such as receiving a signal over a network or parsing stored data indicating (i) that a user (or administrator) of the operations management system has initiated method 200, (ii) that method 200 is scheduled to be initiated at defined times or time intervals, or (iii) that a user of a GUI associated with the method has performed an action in response to which the method 200 should be performed. The method 200 initiates at START block 205 in response to parsing a signal received or stored data retrieved and determining that the signal or stored data indicates that the method 200 should begin. Processing continues to process block 210.

At process block 210, the processor identifies a set of one or more distributions within a series of days. Processing at process block 210 then completes, and processing continues to process block 215.

At process block 215, the processor sorts all demands (for a quantity of goods, products, or items) of a first priority level occurring in the series of days by ascending order of size of the demand. Processing at process block 215 then completes, and processing continues to process block 220.

Blocks 220-230, are repeated for each demand of the first priority level in sorted order. At process block 220, the processor selects an initial distribution during which the demand is scheduled to be fulfilled from the set of distributions. Processing at process block 220 then completes, and processing continues to process block 225. At process block 225, the processor generates one of (i) an indication that the demand can be completely fulfilled, and (ii) an indication that the demand cannot be fulfilled, based on the size of the demand and the amount of supply (of the goods, products, or items) available for assignment in the initial distribution and all previous distributions preceding the initial distribution. Processing at process block 225 then completes, and processing continues to decision block 230. At decision block 230, the processor determines whether or not there are additional demands in the sorted demands of the first priority level. In one embodiment, the processor increments an index for a list of sorted demand objects and determines if there is or is not a demand object in the list at that index. If there is an additional demand (230: YES), processing at decision block 230 completes and processing returns to process block 220. If there is not an additional demand (230: NO), processing at decision block 230 completes and processing continues at process block 235.

At process block 235, the processor automatically arranges or controls display of a graphical representation of a schedule of supplies and met and unmet demands for the series of days in a graphical user interface based at least on the indications generated for each demand. Processing at process block 235 then completes and processing proceeds to END block 240, where process 200 ends.

Each of the foregoing process blocks of method 200 is described in further detail elsewhere herein.

—Distributions—

Referring again to process block 210, in one embodiment, the series of one or more days in a schedule of supplies and demands are first broken down into constructs referred to herein as a "distribution." A distribution is a run of one or more consecutive days (or other time units) in which arriving supply, if any, arrives only on the first day of the one or more consecutive days. Days subsequent to the first day of the distribution have no arriving supply. Thus, an individual day may be a distribution, whether or not it includes arriving supply. Multiple day-distributions begin with a day that may include arriving supply, or may not, but all subsequent days in the distribution have no supply arrivals. Note that the term "arrive" used with respect to supply indicates that the supply becomes available for physical distribution to satisfy demands. The demands falling within the one or more consecutive days associated with a distribution are also associated with the distribution.

In one embodiment, each discrete day is treated as an individual distribution, whether or not that day has some newly available supply. Put another way, each day can be a distribution with a supply of 0 or more units. In one embodiment, it may be desirable or convenient to use the smallest number of distributions possible. Accordingly, in one embodiment, distributions are constructed, such that the first day has some newly available supply, and all subsequent days up to but not including the next day with a supply arrival are included in the distribution. A distribution also has links to the next and previous distributions. For example, in the schedule depicted in FIG. 1, the supplies and demands are gathered into three multi-day distributions of consecutive days in which the first day has a supply, and the other days (if any) do not: Distribution A 165, Distribution B 170, and Distribution C 175. The distributions, whether single-day or multi-day, form a basic block for evaluation of supply—demand assignment across the schedule of supplies and demands.

Figure 3:
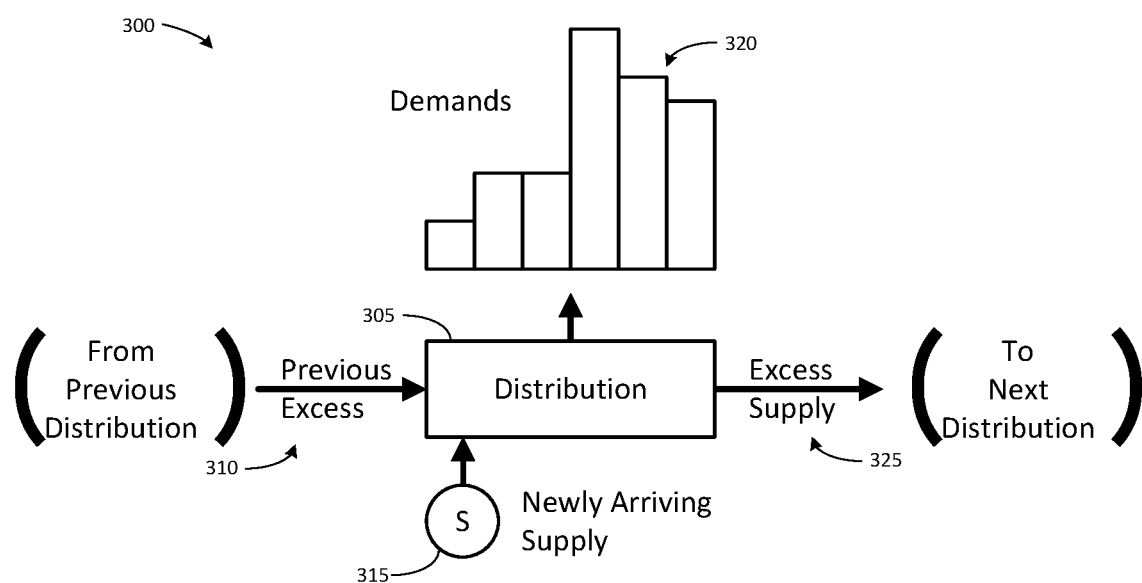
FIG. 3 illustrates one example diagram of the inputs and outputs of a Distribution of supplies to demands associated with sorting-based assignment to optimize order fulfillment with short supply.

FIG. 3 shows one example diagram 300 of the inputs and outputs of a distribution 305. The distribution 305 accepts an excess supply 310 from a previous distribution and any arriving supply S 315. The distribution 305 allocates the combined excess supply 310 and arriving supply S 315, among a set of demands 320, and an excess supply 325 which may be fed into a next distribution.

The arrival time of a demand at a certain time within a distribution's time span is irrelevant to determining solutions with the fewest unmet demands (or maximizing remaining supply for those fewest unmet demands). Also, the exact number of supply deliveries that arrive on the first day of a distribution is also irrelevant: those supplies can be lumped together into a single supply value. A distribution then consists of a single incoming supply value (such as arriving supply S 315) plus previous excess (such as excess supply 310), if any, a set of demands (such as set of demands 320), and an excess supply (such as excess supply 325) representing the number of units that the distribution can pass on to the next distribution, if any. In one embodiment, a distribution 305 may be represented by a software object, class, or other data structure describing the time span of the distribution 305, the sources of supply 310, 315, the allocations of combined supply among the set of demands 320, and the excess supply 325.

In one embodiment, a distribution may be represented by a distribution object or other data structure. The distribution object may include a list of one or more identifiers for its sources of supply (which may be represented by supply objects), a value indicating the total quantity of units provided by those sources of supply, a value indicating a total quantity of unassigned supply remaining to the distribution, a value pair or other data structure indicating the range of days (or other time units) included in the distribution, and values indicating the immediately preceding distribution and immediately subsequent distribution.

In one embodiment, to create one or more distribution objects, the processor may parse the series of days and supply objects associated with the series of days to identify each day in the series that includes a source of supply, and each day in the series that does not include a source of supply. The processor then creates a distribution object for each day that includes a source of supply, and sets the values describing the range of the distribution to start on the day that includes a source of supply and end on the last subsequent day before another source of supply occurs. The processor sets the values of the pointers to and from the immediately precedent and immediately subsequent distribution objects, if any. The processor sets the values of the pointers to and from the supply object(s) for the distribution object. The processor parses the sources to identify the total quantity of units provided by those sources of supply and sets the value indicating the total quantity of unassigned supply remaining to the distribution.

Once the processor has thus completed identifying a set of one or more distributions within a series of days, where each distribution includes (i) a first day on which a supply of a product becomes available for assignment to fulfill demands, and (ii) all days subsequent to the first day in which no additional supply becomes available, processing at process block 210 completes.

—Sorting Demands by Size—

Referring again to process block 215, in one embodiment, all demands in a given priority are sorted by size, with smaller demands first. In other words, all demands of the given priority occurring in the series of days are sorted in ascending order of size of the demand. (Note that the given priority may simply be a single priority for all demands in a non-prioritized scheduling system, or one of several priority levels in a prioritized scheduling system.)

In one embodiment, all demands in a given priority are represented in a list, for example a list of demand objects. The processor executes a sort algorithm on the list that reorders the list so that the demands are in ascending order based on a demand size of each demand. The processor may parse the demand object to determine the demand size. In one embodiment, the sort algorithm may be any general sorting algorithm suited to operation on large lists, such as merge sort, heapsort, or other sorts with a worst-case performance not exceeding O(n log n).

In one embodiment, where there are multiple demands of the same size, the multiple demands of the same size are further sorted by time, so that the farthest forward in time appears first in the sorted list of all demands in the given priority. This is done in order to ensure that an optimal solution is found for additional priority levels beyond the first priority level, as discussed in further detail with reference to FIG. 6.

After the processor has thus completed sorting all demands of a first priority level occurring in the series of days by ascending order of size of the demand, processing at process block 215 completes.

Note that the step of sorting contributes substantially to the speed of the systems and methods described herein. After a sort of all demands in a priority level, all demands are visited just once each during operation of the assignment algorithm, and for each demand, only a small number of supplies are visited during operation.

—Assigning Supply to Demands—

In one embodiment, after the demands are sorted into ascending order of demand quantity, supply is assigned to each demand in order, always using the most recent possible supply. In other words, the current distribution's supply is used to fill the demand, and if that is not sufficient, supply from the previous distribution is considered, and so on backwards in time.

In one embodiment, a demand may be represented by a software object, class, or other data structure. In one embodiment, the demand object includes a function for assigning supply to demands. For example, pseudo code for a demand object follows:

```
01  Class: Demand
02      field: integer units
03          //When units is lowered to 0 the demand is met.
04
05      field: Distribution myDistribution
06          //An instance of class Distribution.
07
08      field: Map supplyAssignmentsMap<Distribution, Integer>
09          // supplyAssignmentsMap records how much was supplied from
10          // each distribution
11
12      method: tryFill( )
13          dist = myDistribution
14          tempUnits = units;
15          while(tempUnits != 0 && dist != null)
16              x = min(dist.supply , tempUnits)
17              tempUnits = tempUnits - x
18              dist.supply = dist.supply - x
19              supplyAssignmentsMap.put(dist, x)
20              if(dist.supply == 0)
21                  dist = dist.previousDistribution
22          if(tempUnits != 0)
23              //Was not able to completely fulfill this demand.
24              //Use the supplyAssignmentsMap to give back the
25              // supply that was used above.
26              replaceSupply(supplyAssignmentsMap)
27          else
28              //We were able to completely fill this demand.
29              //Indicate this by setting the units to 0.
30              units = 0
```

The pseudo code may be considered to describe one or more computer-implemented methods that may be performed by a processor of one or more computing devices (i) accessing memory and (ii) configured with logic to cause the system to execute the step of the method, as described above. Note that lines beginning with "//" are comments to the pseudo code.

In one embodiment, the demand object includes a field "units" identifying a quantity of units that are required to satisfy the demand represented by the demand object, as shown for example at line 02 of the pseudo code above. This is the total quantity of units that needs to be supplied in order to meet the demand represented by the demand object. The quantity of units for the demand may be an integer value, reflecting the case in which partial units (for example, half of a shirt) are not permitted. In other embodiments, fractional units may be permitted, for instance when fulfilling orders for bulk items. When the quantity of units is reduced to 0 (as further described herein), this represents the state where the demand is met.

In one embodiment, the demand object includes a field "myDistribution" identifying a specific distribution to which the demand object is assigned, as shown for example at line 05 of the pseudo code above. The specific distribution identified by myDistribution is the distribution within which the distribution is scheduled. For example, referring briefly to FIG. 1, demand objects for example met demand 135 and example unmet demand 140 (each for Saturday at Priority 2) would both have a myDistribution value identifying distribution B 170, while example met demand 180 (for Wednesday at Priority 2) would have a myDistribution value identifying distribution A 165. The identifier may be of the distribution type of data structure described above. For example, the identifier may be a specific instance of class Distribution. Referring again to process block 220, in one embodiment, the specific distribution identified by the myDistribution field is the initial distribution during which the demand is scheduled to be fulfilled. In one embodiment, the processor parses the demand object to extract the value of the myDistribution field, and selects the distribution identified by that value from among the other distributions in the set of distributions associated with the series of days.

Once the processor has thus completed selecting an initial distribution during which the demand is scheduled to be fulfilled from the set of distributions, processing at process block 220 completes.

In one embodiment, the demand object includes a field "supplyAssignmentsMap<Distribution, Integer>" listing the source distribution(s) and quantities of supply, as shown for example at line 08 of the pseudo code above. The listing may be of data type Map or other associative array storing a collection of key-value pairs. The distribution(s) of origin for an assigned supply and the integer quantities of units assigned from that distribution form the respective key and value pairs—each distribution from which supply is assigned to the demand is stored as a key, and the integer number of units assigned from that distribution is stored as the respective value for that key.

In one embodiment, execution of the tryFill( ) method described at lines 12-30 of the pseudo code above attempts to assign the demand quantity of units for the demand object from available supply. Referring again to process block 225, in one embodiment, the generation of indications that a demand (i) can be completely fulfilled or (ii) cannot be completely fulfilled is performed by a processor executing the steps of the tryFill( ) method.

Figure 4:
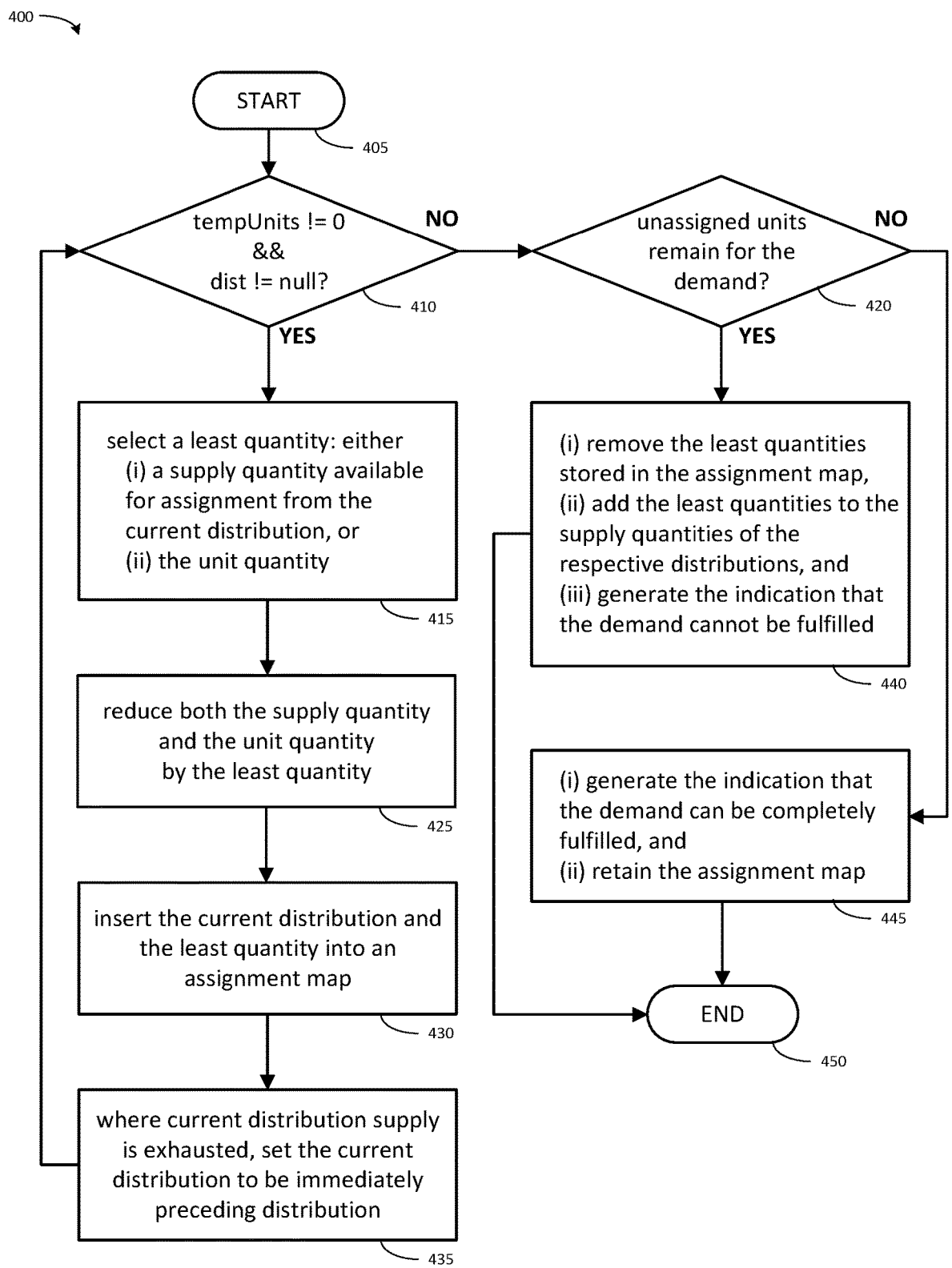
FIG. 4. illustrates one embodiment of a method for attempts to assign the demand quantity of units for the demand object from available supply associated with sorting-based assignment to optimize order fulfillment in short supply situations.

FIG. 4. illustrates one embodiment of a method 400 for attempts to assign the demand quantity of units for the demand object from available supply associated with sorting-based assignment to optimize order fulfillment in short supply situations. The method 400 initiates based on various triggers, such as receiving a signal over a network or parsing stored data indicating a request to perform the assignment. In one embodiment, method 400 is performed as part of a larger process, such as method 200 as shown and described with reference to FIG. 2, where it may be performed as part of step 225 of method 200. The method 400 initiates at START block 405.

At start block 405, certain variables are initiated. In one embodiment, as shown at line 13 of the pseudo code, a variable "dist", representing a current distribution under consideration as a source of supply in the tryFill( ) method, is initialized to the value of myDistribution, the distribution to which the demand object is assigned. At line 14 of the pseudo code, a variable "tempUnits", representing the number of outstanding, unassigned units in the demand object during the course of the operation of the tryFill( ) method, is initialized to the value of the variable units, the total number of units required to satisfy the demand represented by the demand object. Once the variables are initiated, START block 405 completes and processing continues to decision block 410.

At decision block 410, the processor determines whether both (i) a number of units associated with this demand (referred to herein as a "unit quantity") of unassigned units for the demand remain (tempUnits !=0), and (ii) a current distribution under consideration remains unevaluated among the initial distribution and the previous distributions (dist !=null), or in other words, the current distribution exists. Condition (ii) will remain true until, at process block 435 below, the processor sets the current distribution to be the distribution preceding the earliest one in the series of days, which does not exist. In one embodiment, these are the conditions for continuing a while loop to temporarily assign available supply to one particular demand in order to attempt to determine whether available supply can be assigned to completely fulfill the demand.

Lines 15-21 of the pseudo code show a while loop to temporarily assign available supply to the demand. At line 15 of the pseudo code, the while loop is given a conditions requiring both (1) that the number of outstanding units without an assigned source of supply (tempUnits) has not reached 0 (tempUnits !=0), and (2) that there are remaining distributions from which supply can possibly be drawn (dist !=null). The loop repeats until either there is no further need for supply units (the demand is satisfied, tempUnits==0), or the demand object has run out of distributions from which it can draw supply (dist==null).

In one embodiment, the processor retrieves the values of tempUnits and dist and compares them with the base condition values 0 and null, respectively. The processor determines whether the value of tempUnits does not equal 0. The processor also determines whether the value of dist does not equal null. If both expressions are true (410: YES), processing at decision block 410 completes and processing continues to process block 415. If either expression is not true (410: NO), then the base condition of the while loop is reached, and processing at decision block 410 completes and processing continues to process block 420.

At process block 415, the processor selects as a least quantity one of (i) a supply quantity available for assignment from the current distribution under consideration and (ii) the unit quantity. In one embodiment, as shown at line 16 of the pseudo code, within the loop, a variable x, is set to the lesser of (1) the entire supply available from the current distribution under consideration, or (2) the number of units still not assigned a source of supply (x=min(dist.supply, tempUnits)). The variable x represents a number of units being taken from the current distribution under consideration. The supply variable may be directly accessed from the distribution object class, and represents the quantity of unassigned supply units in a particular instance of a distribution. In one embodiment, the processor may retrieve the values of both dist.supply and tempUnits, compare the two values to determine which is least, and set the value of x to that least value. Once the processor has thus completed selecting as a least quantity one of (i) a supply quantity available for assignment from the current distribution under consideration and (ii) the (temporary) unit quantity, processing at process block 415 completes, and processing continues to process block 425.

At process block 425, the processor reduces both the supply quantity and the unit quantity by the least quantity. One embodiment is shown at lines 17 and 18 of the pseudo code. At line 17 of the pseudo code, the amount of units still requiring assignment of supply is reduced by the amount being taken from the current distribution under consideration (tempUnits=tempUnits-x). At line 18 of the pseudo code, the amount of supply available from the current distribution under consideration is also reduced by the amount being taken from the current distribution under consideration (dist.supply=dist.supply-x). In one embodiment, the processor subtracts the value of x from tempUnits and stores the resulting quantity as the new value of tempUnits, and subtracts the value of x from dist.supply and stores the resulting quantity as the new value of dist.supply. Once the processor has thus completed reducing both the supply quantity and the unit quantity by the least quantity, processing at process block 425 completes, and processing continues at process block 430.

At process block 430, the processor inserts the current distribution and the least quantity into an assignment map. In one embodiment, as shown at line 19 of the pseudo code, the distribution under consideration and the amount being taken from that distribution are added as key and value, respectively, into a map data structure listing the source distribution(s) and quantities of supply (supplyAssignments- Map.put(dist, x)). The map data structure stores key (or identifier) and value (or content) pairs where every key is unique. The put function inserts the key-value pair if the key is not already present in the map, and replaces the value at the key in the map with the value provided as an argument if the key is already present in the map. In one embodiment, the processor retrieves the value of dist that identifies the current distribution under consideration, and the value of x, and executes the put function with the values of dist and x as the key and value arguments, respectively. Once the processor has thus completed inserting the current distribution and the least quantity into an assignment map, processing at process block 430 completes, and processing continues at process block 435.

At process block 435, in response to the supply quantity available for assignment from the current distribution being completely exhausted, the processor sets the current distribution to be a previous distribution immediately preceding the current distribution. In one embodiment, shown at lines 20-21 of the pseudo code, if there is no supply remaining in the current distribution under consideration, the current distribution under consideration is set to be the immediately prior distribution (if(dist.supply==0) dist=dist.previousDistribution). The previousDistribution variable may be directly accessed from the distribution object class, and represents the next distribution object earlier in time than the distribution object being queried, that is, the distribution object for the next distribution earlier in time (the immediately prior distribution). In one embodiment, the processor retrieves the value of dist.supply and determines that it is 0. In response, the processor retrieves the value of dist.previousDistribution, and stores the retrieved value of dist.previousDistribution as the new, updated value of dist in order to set the current distribution under consideration to be the immediately preceding distribution. Once the processor has thus completed setting the current distribution to be a previous distribution immediately preceding the current distribution, processing at process block 435 completes.

The while loop then returns to line 15 of the pseudo code, where the loop condition is re-evaluated. Processing returns to decision block 410. Once either of the base conditions of decision block 410 become un-satisfied (tempUnits !=0 && dist !=null) processing proceeds to decision block 420.

At decision block 420, the processor determines whether unassigned units remain for the demand. In one embodiment, as shown at lines 22-30 of the pseudo code, the results of the operation of the while loop are evaluated to determine whether or not it is possible to completely satisfy the demand represented by the demand object, based on whether or not the amount of units without an assigned source of supply has been reduced to zero. In one embodiment, the processor retrieves the value of tempUnits which records the amount of units for which a demand has no assigned source of supply. The processor determines whether or not the value of tempUnits is zero. If the value of tempUnits has not been reduced to zero, unassigned units remain (420: YES), and available supply is not sufficient to completely fulfill the demand. Processing at decision block 420 then completes, and processing continues at process block 440. If the value of tempUnits has been reduced to zero, no unassigned units remain (420: NO), and available supply is sufficient to completely fulfill the demand. Processing at decision block 420 then completes, and processing continues at process block 445.

At process block 440, in response to a determination that unassigned units for the demand remain, the processor (i) removes the quantities stored in the assignment map, (ii) adds the quantities to the supply quantities of the respective distributions, and (iii) generates the indication that the demand cannot be fulfilled. Every quantity stored in the assignment map for this demand is removed and added back to the respective distribution from which the quantity was assigned. In one embodiment, lines 22-26 of the pseudo code represent this first case, where the while loop operations show that available supply is not sufficient to completely fulfill the demand. If there remain any amount of units without an assigned source of supply (if(tempUnits!=0)), then it is not possible to satisfy the demand represented by the demand object from the available sources of supply. In this case, the listing of the source distribution(s) and quantities of supply should be parsed to reverse the supply process and give the assigned supplies back to their source distributions (replaceSupply(supplyAssignmentsMap)). In the replaceSupply function, the distribution-quantity pairs (key-value) of the provided map are each parsed in turn to identify the quantity deducted from each distribution, and that amount deducted is then added to the available supply (dist.supply) of that distribution to cancel the assignment from that distribution. Further, in contrast to the operation of lines 27-30 of the pseudo code discussed below, the quantity of units required to satisfy the demand is not permanently updated, because the demand cannot be completely met. Both the replacement of the supply assignments and the lack of permanent update to the quantity of units lacked (that is, the quantity of units required to satisfy the demand) may serve as an indication that the demand cannot be fulfilled, as described with reference to process block 225. In another embodiment, the processor sets a "fulfillable" flag value to be false in the demand object for the demand, which may also serve as an indication that the demand cannot be fulfilled, as described with reference to process block 225. In one embodiment, the processor executes the replaceSupply( ) function on the supplyAssignmentsMap. The processor retrieves each source distribution dist and assigned quantity in turn from the supplyAssignmentsMap, and adds the assigned quantity to the dist.supply for that source distribution. In one embodiment, the processor retains the original number of quantity of units lacked for the distribution as the indication that the demand cannot be fulfilled. Processing at process block 440 then completes and processing continues to END block 450, where method 400 ends.

At process block 445, in response to a determination that unassigned units for the demand do not remain, the processor (i) generates the indication that the demand can be completely fulfilled, and (ii) retains the assignment map. After completion of the while loop resulting in assignment of supply to all units of the demand, the assignment map indicates all the source distributions and quantities for all supply assigned to the demand. In one embodiment, lines 27-30 of the pseudo code represent this second case, where the while loop operations show that the demand can be completely fulfilled from available supply. If there does not remain any amount of units without an assigned source of supply (else), then it is possible to satisfy the demand represented by the demand object from the available sources of supply. In one embodiment, the processor permanently updates the quantity of units that are required to satisfy the demand represented by the demand object is permanently to zero (units=0) to signify that the demand is met. This may serve as an indication that the demand can be completely fulfilled, as described with reference to process block 225. In another embodiment, the processor sets a "fulfillable" flag value to be true in the demand object for the demand, which may also serve as an indication that the demand can be completely fulfilled, as described with reference to process block 225. In one embodiment, the processor stores the supplyAssignmentsMap in association with the demand object for the demand, for example by recording an identifier for the map in the demand object. Processing at process block 445 then completes and processing continues to END block 450, where method 400 ends.

The tryFill( ) method is invoked for each of the demand objects in order to assign a supply for the demand represented by the object, if possible, as shown at blocks 220-230 of FIG. 2. The tryFill( ) method is invoked in the sorted order (smallest to largest) of the demands at each priority level.

—Proof of Optimality—

It may not be obvious that this approach is optimal: Why would one fill a smaller demand today when it might be possible to use that supply in combination with current and possibly future supply to fill two larger demands? But this is impossible, as shown below.

Assume that the algorithm described by the tryFill( ) method pseudo code has completed, and has assigned supplies to demands. The result can be proved by contradiction to be optimal—having the fewest unmet demands for the given supply. If there is a more optimal solution it would mean one could abandon n of the algorithm's filled demands in order to meet m>n of the algorithm's unfilled demands. Consider first the case n=1, m=2.

Note that in the context of this proof, there are two different time aspects under consideration. First, there is the date that a demand is to be filled at the inventory site, which may be thought of as the "ship" date or "demand" date. This concept is represented by the placement of demand icons within date columns in the GUI as shown in FIG. 1—(for example, the ship date of example met demand 180 is Wednesday 185). When discussing this time aspect, spatial terms like "left" and "right" are used to indicate position on a timeline of demand ship dates, with earlier ship dates to the left and later ship dates to the right, as shown in FIG. 1. Second, there is the time that the algorithm attempts to fill the demand. This concept may be conceived of as answering the question "at what point in the operation of the algorithm is this demand processed?" (or "where is the demand located in the algorithm's timeline list?"). When discussing this time aspect, temporal terms like terms like "before," "after," "earlier," and "later" are used, and express a time at which the algorithm attempted to fill the demand.

There are 2 situations to be contradicted in the proof: (1) the possibility that one or more smaller unfilled demands can be filled by reassigning units from a filled demand; and (2) the possibility that more than one larger unfilled demand can be filled by reassigning units from a filled demand. In both cases, the situations are shown to be impossible.

Proof—Smaller Unfilled Demands

Recall that all demands in a given priority are sorted by size, with smaller demands first, and larger demands last; and recall also that supply is always assigned from the most recent possible source of supply. The sorted list of demands of the given priority is traversed from smallest to largest, and the method to assign a supply for the demand represented by the object, if possible, (e.g. the tryFill( ) method) is invoked for each demand object. Thus, supply is assigned from the source most recent in time to each demand in the given priority in ascending order of demand size.

After the assignment is complete, is it possible to reassign units from a demand D to fill one or more smaller, unfilled demands? Consider one such smaller demand, X. As all the demands are processed in ascending order from smallest to largest in the assignment algorithm, demand X was processed before demand D. The algorithm visited demand X first, and attempted to fill demand X, but failed. There is nothing that can be done later in the algorithm (for example, when reaching demand D) to change that. It is therefore impossible to fill smaller demands determined to be unfillable the assignment algorithm by reassigning units from a larger demand.

Proof—Larger Unmet Demands

Turn now to considering whether it is possible to abandon demand D to fill demands that are equal to or larger than demand D. Recall again that an attempt to assign a supply is made for each demand object from smallest to largest in a given priority.

Figure 5A:
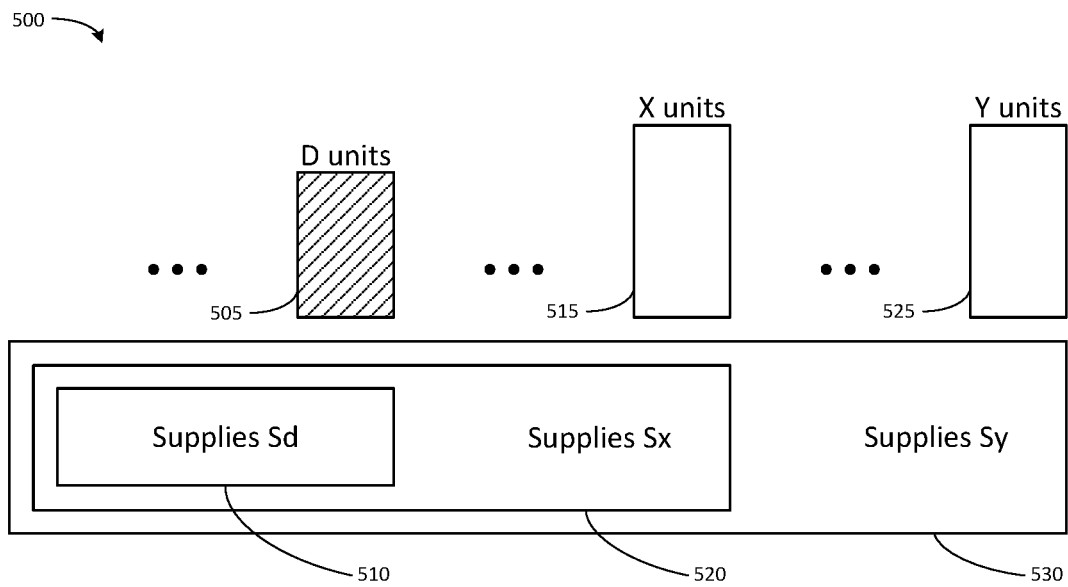
FIG. 5A illustrates a hypothetical timeline of supplies and demands in which supply is not reassigned from demand of D units in an attempt to meet two larger demands.

FIG. 5A illustrates a hypothetical timeline 500 of supplies and demands in which supply is not reassigned from demand of D units 505 in an attempt to meet two larger demands. After the assignment algorithm is complete, D-unit demand 505 is assigned supply from the set of supplies Sd 510 (as indicated by shading applied to D-unit demand D 505). Suppose there are two demands that were not filled by the assignment algorithm: a demand of X units 515 that could draw supply from a set of supplies Sx 520, and another demand of Y units 525 that could draw from a set of supplies Sy 530. These two demands, X-unit demand 515 and Y-unit demand 525 are for unit quantities (X and Y) that are as large or larger than D. Note that X-unit demand 515 and Y-unit demand 525 could occur anywhere on the timeline, but without loss of generality they are illustrated as occurring to the right of D-unit demand 505.

Figure 5B:
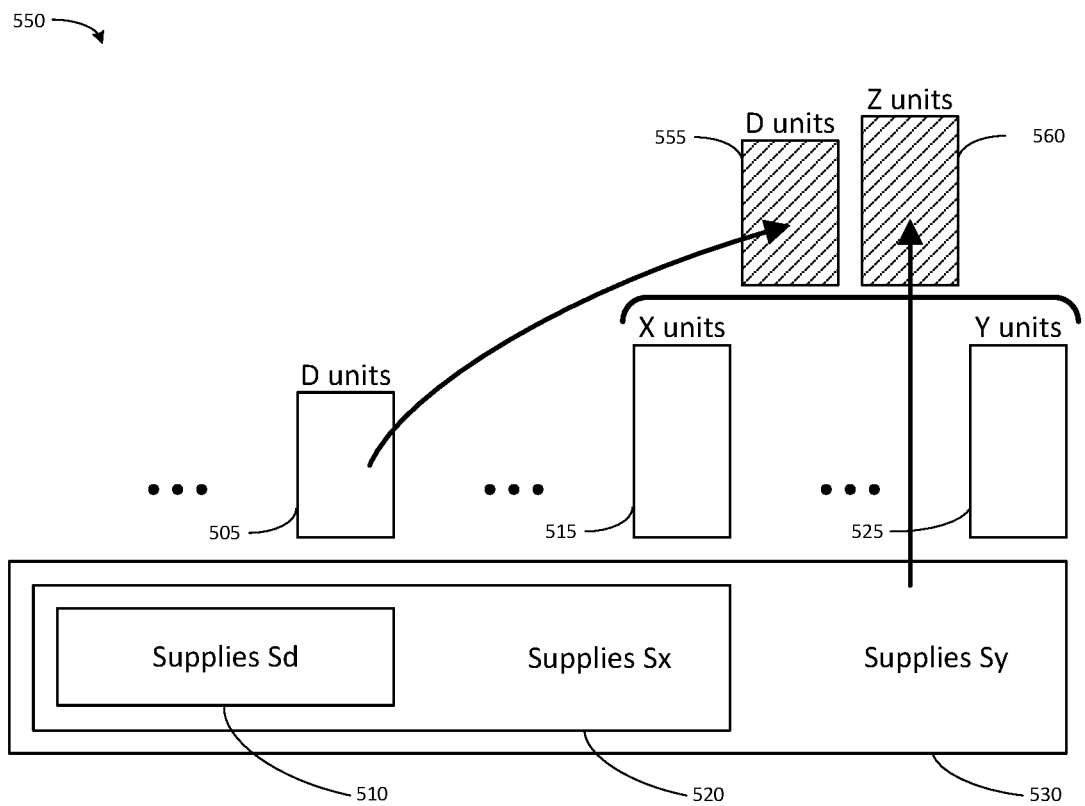
FIG. 5B illustrates a hypothetical timeline of supplies and demands in which supply is reassigned from demand of D units in an attempt to meet two larger demands.

FIG. 5B illustrates a hypothetical timeline 550 of supplies and demands in which supply is reassigned from demand of D units 505 in an attempt to meet two larger demands. Consider the Y-unit demand 525 to be further to the right of the X-unit demand 515. When the assignment algorithm completes, there remain unused supply units in set of supplies Sy 530, and we denote this amount as Z. Might it have been better to (i) abandon the filled D-unit demand 505 (as indicated by removing shading D-unit demand D 505), (ii) combine the freed D units 555 with the Z units 560 (as indicated by applied shading), and (iii) apply the combination to fulfill X-unit demand 515 and Y-unit demand 525, as illustrated in FIG. 5B?

This question can be reduced to evaluation of whether it is possible to satisfy the expression:

$$D+Z \geq X+Y \qquad \text{(Exp. 1)}$$

Clearly, expression 1 can never be satisfied, because D is less than or equal to X, and Z is less than Y.

The above is a simple case. The assignment algorithm commonly assigns multiple demands to be met, and so, to generalize, the question arises, "what if there were n met demands with n+1 demands left unmet? Might it have been better to abandon any particular met demand in favor of fulfilling another larger unmet demand?" This can be evaluated by determining if it is possible to satisfy the generalized expression:

$$D(1)+D(2)+\ldots+D(n)+Z \geq X(1)+X(2)+\ldots+Y \qquad \text{(Exp. 2)}$$

Similar to the evaluation of expression 1 above, expression 2 cannot be satisfied. The presence of an additional met demand D(i) does not resolve the problem because the additional unmet demand X(i) is always equal to or larger than the additional met demand (because the demands are evaluated from smallest to largest) and with the insufficient Z, the expression cannot be satisfied.

Thus the general conclusion is reached: no matter where in time the assignment algorithm's met and unmet demands occur, it is impossible to meet more demands by abandoning some of the met demands to combine their units with any available excess to fill a greater number of unmet demands.

—Prioritized Scheduling—

Figure 6:
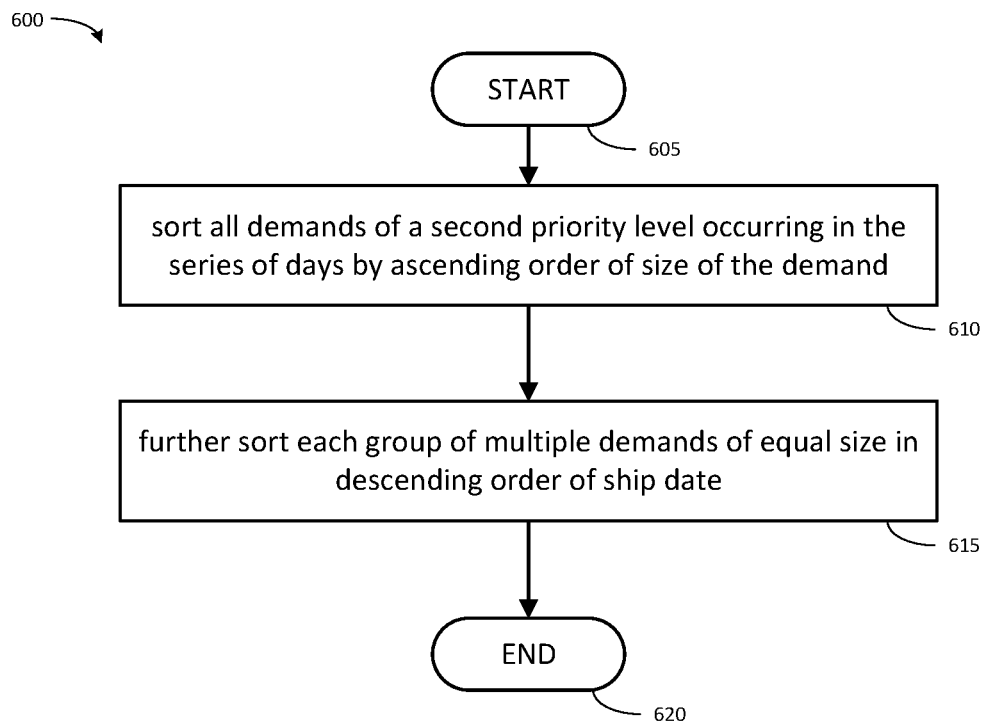
FIG. 6 illustrates a method associated with sorting-based assignment to optimize order fulfillment across multiple order priority levels in short supply situations.

FIG. 6 illustrates a method 600 associated with sorting-based assignment to optimize order fulfillment across multiple order priority levels in short supply situations. The method 600 incorporates further sorting of multiple demands of equal size in descending order of ship date within the set of demands sorted from smallest to largest. The method 600 initiates based on various triggers, such as receiving a signal over a network or parsing stored data indicating that demands managed by the scheduling system have more than one order priority level. In one embodiment, method 600 is performed as part of a larger process, such as method 200 as shown and described with reference to FIG. 2. The method 600 initiates at START block 605 and proceeds to process block 610.

At process block 610, the processor sorts all demands of a second priority level occurring in the series of days by ascending order of size of the demand. In one embodiment, this sorting is performed by the processor in a substantially similar manner as shown and described for the sorting of a first priority level with reference to process block 215 of method 200 herein. Additional priority levels beyond two may also be added. Note though, that the set of demands for each different priority level is both listed and sorted separately. Once the processor has thus completed sorting all demands of a second priority level occurring in the series of days by ascending order of size of the demand, processing at process block 610 completes, and processing continues to process block 615.

At process block 615, for the sorted demands at each priority level the processor further sorts each group of multiple demands of equal size in descending order of ship date. In one embodiment, not only are all demands in a given priority sorted by size from smallest to largest, but also, demands of equal size are arranged in within the sorted demands in a particular order. Where there are multiple demands of equal size in a given priority, the demands of equal size are sorted so that demands with later ship dates (the rightmost demands) appear before demands having earlier ship dates (the leftmost demands) in the sorted list. Thus, the algorithm sorts equal-sized demands such that the rightmost of them is assigned supply first.

This further sorting of multiple demands of equal size by ship date may not be necessary where demands are not associated with a priority level, or in other words, where there is no prioritization of demands or the demands all have the same priority. But, further sorting of multiple demands of equal size by ship date guarantees an optimal solution through all priority levels when there are multiple levels of priority. Thus, in one embodiment, where there is only one priority level, the demands can be sorted by ascending size alone. In another embodiment, where there are two or more priority levels, the set of demands belonging to each priority level is first sorted in ascending order of size, and then each set of multiple demands of equal size in that priority level is further sorted in descending order of ship date, from latest ship date to earliest ship date. In general, supplies to the right (that is, supplies having a later availability date) can service fewer demands than supplies to the left (supplies having an earlier availability date). A demand to the right might be filled by a supply to the right, leaving more leftward supply. This in turn means the remaining supply may be able to fill more demands during the next priority pass. Thus, given a choice amongst equal sized demands to fill, it is better to choose the rightmost demand to fill first where there are multiple levels of priority.

In one embodiment, where there are multiple demands of the same size, the processor identifies groups of the multiple demands of the same size. For each of these groups of multiple demands, the processor further sorts them by time, so that the farthest forward in time appears first in the sorted group. For example, the processor may parse the objects representing each demand in a group of multiple demands of equal size to determine a ship date for the demand. The processor then executes a sort algorithm to place these demands in descending order of ship date. The processor reinserts each sorted group in its new order into the list of all demands sorted by demand size. The reinserted, sorted groups thus have the demand with the latest shipping date earliest in the queue (the prioritized list) for assignment of supply. Once the processor has thus completed further sorting each group of multiple demands of equal size in descending order of ship date, processing at process block 615 completes, and processing continues to END block 620, where method 600 completes.

In response to the completion of method 600, both (i) the selection of an initial distribution and (ii) the generation of an indication of whether the demand can be filled are further performed by the processor for each demand of the second priority level in sorted order in addition to the performance for each demand of the first priority level. Generally, these two steps are further performed by the processor for the demands of each additional priority level n. Further, the demands of the second (and any additional) priority level are included in the graphical representation of the schedule, as shown and described for example with reference to FIG. 1. In one embodiment, where no priority level is applied to demands (that is, only one priority level exists in the problem to be solved) method 600 may not be needed. In one embodiment, where there are multiple priority levels, both (i) sorting the demands of the priority level in by ascending order of size, and (ii) sorting each group of demands of equal size in descending order of ship date, (for example as shown in the steps of method 600) are performed at each priority level. In one embodiment, where there are multiple priority levels, the sorting of the demands for a priority level is performed after the assignment solution for the previous priority levels is completed.

—Automated Implementation of Schedule—

Figure 7:
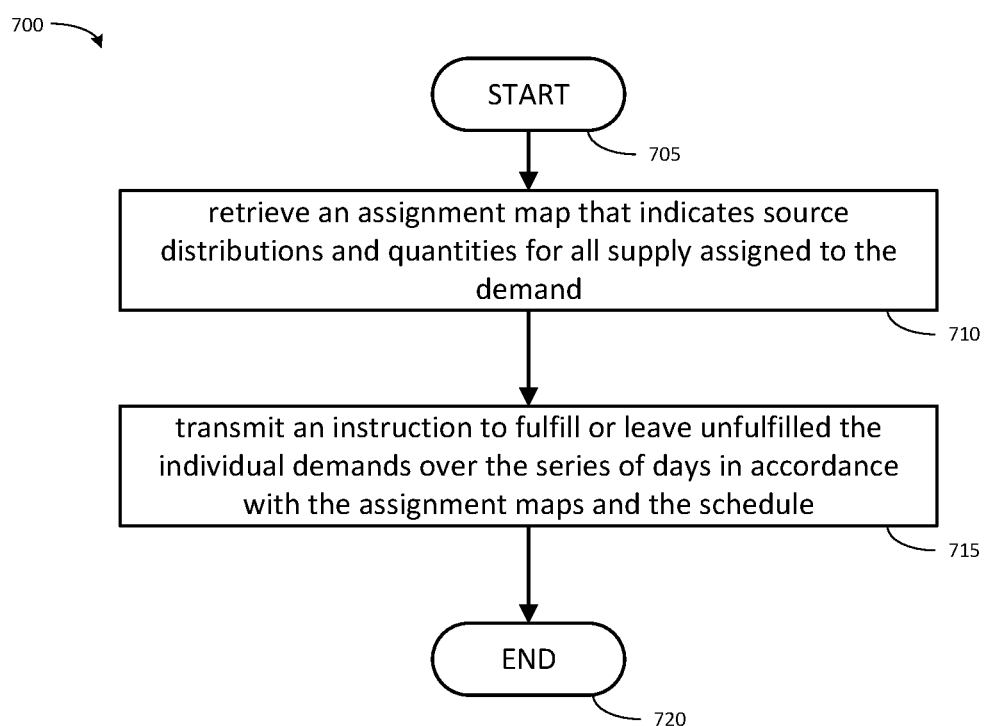
FIG. 7 illustrates a method associated with automated implementation of schedules of supplies and met and unmet demands generated by sorting-based assignment to optimize order fulfillment in short supply situations.

FIG. 7 illustrates a method 700 associated with automated implementation of schedules of supplies and met and unmet demands generated by sorting-based assignment to optimize order fulfillment in short supply situations. The method 700 initiates based on various triggers, such as receiving a signal over a network or parsing stored data indicating that (i) a schedule is intended to control order fulfillment by an integrated business system, or (ii) a GUI has accepted an input indicating that a current schedule should be used to control order fulfillment by an integrated business system. In one embodiment, method 700 is performed as part of a larger process, such as method 200 as shown and described with reference to FIG. 2. The method 700 initiates at START block 705 and proceeds to process block 710.

In one embodiment, the processor generates an assignment map for each demand as shown and described with reference to process block 430. The processor then stores the assignment map in association with a demand object for the fulfilled demand. The demand object includes an identifier for the map.

At process block 710, for each demand that is completely fulfilled, the processor retrieves an assignment map that indicates source distributions and quantities for all supply assigned to the demand. The processor parses the demand object to obtain the identifier for the map, and then retrieves the identified map. Process block 710 then completes and processing continues at process block 715.

At process block 715, the processor transmits an instruction to fulfill or leave unfulfilled the individual demands over the series of days in accordance with the assignment maps and the schedule. In one embodiment, the processor first generates the instruction. The processor parses the schedule to identify each demand met and left unmet. For each demand met, the processor identifies the source distributions and supply quantities from the retrieved map for that demand, and generates an instruction to fulfill that demand using the identified supply quantities of units from the identified sources. The processor transmits the instruction within the operations management system (for example, to an order processing module of an integrated business server 1240 in FIG. 12) to initiate operations to effect the fulfillment of the demands. The instruction acts to control the activities performed in order to fulfill the demand, constraining the demand to be supplied by the identified supply quantities of units from the identified sources. In one embodiment, in response to receiving the instructions, the integrated business server 1240 may generate and transmit instructions that cause, for example: (i) printing, display, or transmission (for example by email, fax, text, Electronic Data Interchange or other protocol) of warehouse pick and/or pack instructions to effect the fulfillment of the demand using the identified supply quantities of units from the identified sources; or (ii) one or more robots or other automated machines to retrieve the identified supply quantities of units from the identified sources from a warehouse or other storage location, pack, and ship the units of the met demands. Thus, the order represented by the demand will be fulfilled in a manner that ensures that benefits of sorting-based assignment to optimize order fulfillment in short supply situations are realized. Once the processor thus completes generating and transmitting an instruction to fulfill or leave unfulfilled the individual demands over the series of days in accordance with the assignment maps and the schedule, processing at process block 715 completes, and processing continues to END block 720, where method 700 ends.

—Requiring a Demand to be Met or Unmet—

A business may require that a particular demand to be met even if supplies are scarce. The user of the tool 100 may desire to consider the effect of requiring the particular demand to be met. The method described above can be modified to apply this constraint by first filling all demands required to be met before filling any other demands. A sorting-based fulfillment optimization method can then be applied in view of this additional constraint to find a new optimum, if it exists. In one embodiment, in response to an input that indicates that a particular demand is required to be met, the processor fills the particular demand first before filling other demands.

Similarly, the user of the tool 100 may desire to investigate the effect of requiring a particular demand to be unmet. This may be accomplished by simply filtering out any demands that are required to be left unmet during sorting-based fulfillment optimization. In one embodiment, in response to an input that indicates that the particular demand is required to be unmet, the processor filters the particular demand out of all demands occurring in the series of days.

Figure 8:
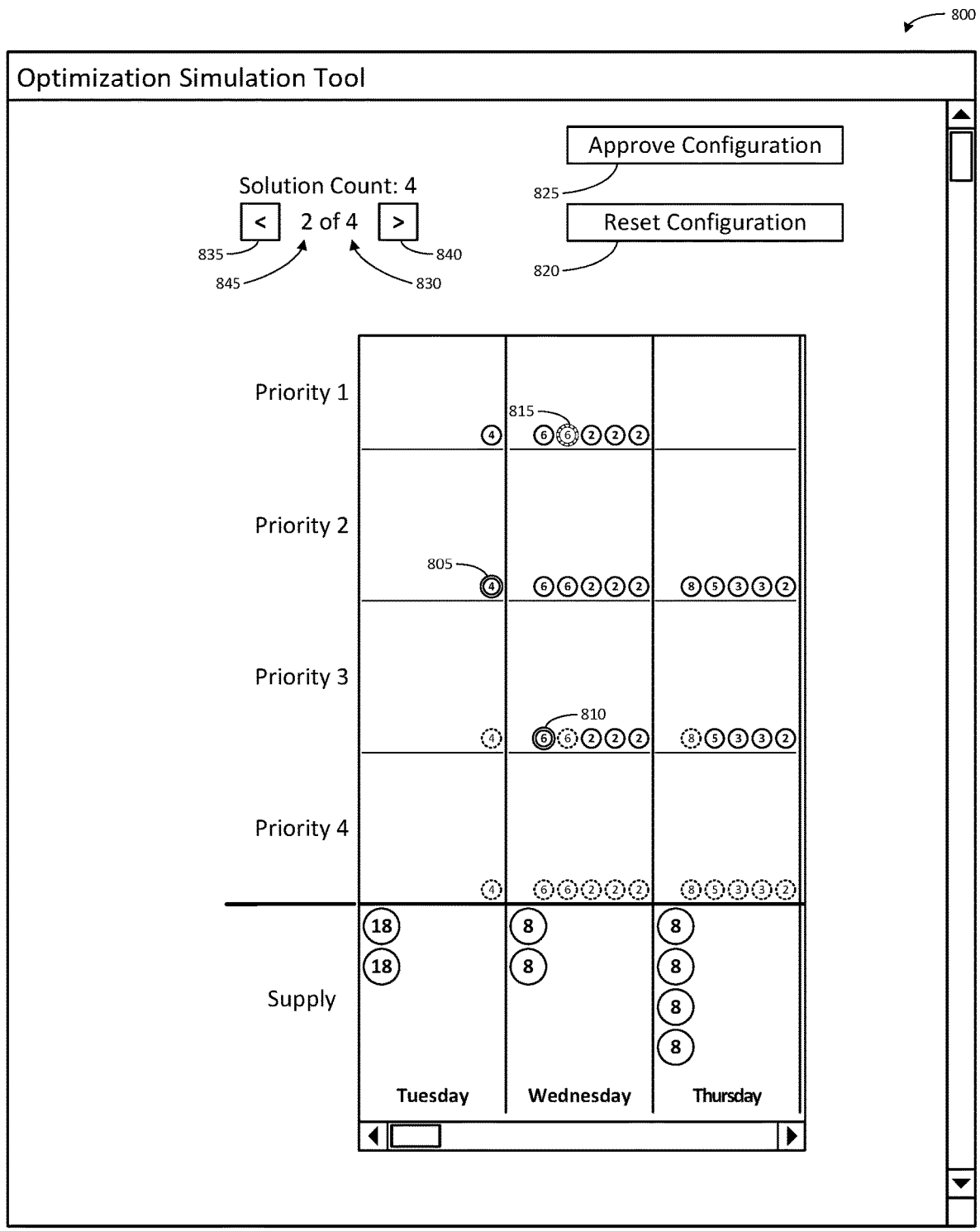
FIG. 8 illustrates one embodiment of a tool for representing and manipulating scheduled supplies and demands in a GUI.

FIG. 8 illustrates one embodiment of a tool 800 such as tool 100 for representing and manipulating scheduled supplies and demands in a GUI. In this embodiment, a user may interact with the tool 800 to require demands to be met or unmet. In order to effect a requirement that a demand be met, the processor may set a "must meet" flag value in the demand object for the demand to be true.

In order to effect a requirement that a demand be unmet, the processor may set a "must not meet" flag value in the demand object for the demand to be true. Thus, when parsing the demand objects in a sorted list during sorting-based fulfillment optimization, the processor can detect these flags. The processor can then determine from the settings of these flags whether the demand must be filled before any other demands where the demand is required to be met, or whether the demand should be ignored entirely where the demand is required to be unmet, or whether neither situation applies to the demand.

Figure 9A:
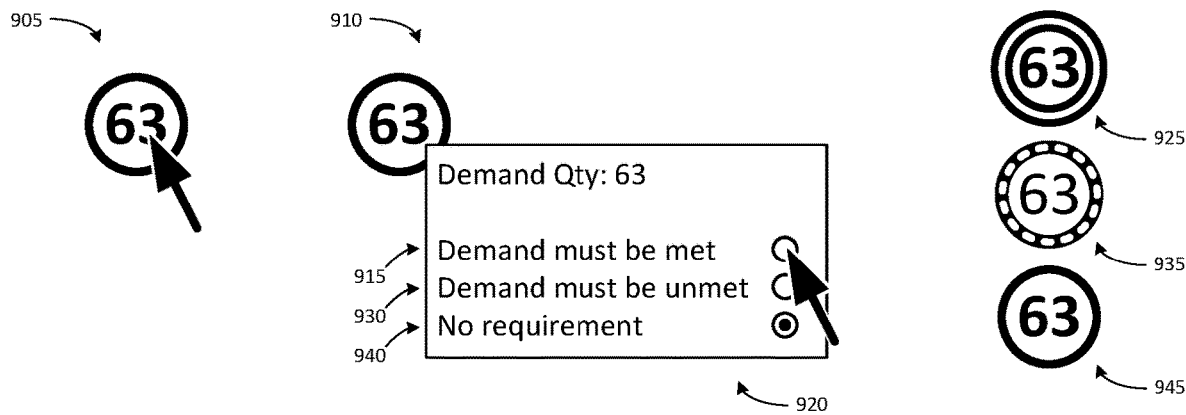
FIG. 9A illustrates enlarged views of example interactions with the tool to mark a particular example demand as required to be met or unmet.

FIG. 9A illustrates enlarged views of example interactions with the tool to mark a particular example demand as required to be met or unmet. For example, the tool 800 (or 100) may receive a user requirement that a particular demand must be met by receiving a mouse click on a demand circle (or other icon) associated with the particular demand 905, displaying a menu 910 including an option to require that the demand be met 915, receiving a mouse click indicating a selection 920 of the option requiring that the demand be met 915, and store that requirement by setting the must meet flag in the demand object associated with the demand. The tool 800 may further display a visual indication that the demand is required to be met 925, for example by including a double border around the demand circle, or adding a colored border, such as a blue border, to the demand circle.

The user may also require a demand to be unmet by marking it as required to be unmet using the tool 800. For example, the tool 800 may receive a user requirement that a particular demand must be unmet by receiving a mouse click on a demand circle associated with the particular demand 905, displaying a menu 910 including an option to require that the demand be unmet 930, receiving a mouse click indicating a selection 920 of the option requiring that the demand be unmet 930, and storing that requirement by setting the must not meet flag in the demand object associated with the demand. The tool 800 may further display a visual indication that the demand is required to be unmet 935, for example by including a outline-dotted border around the demand circle, or adding a colored border, such as a red border, to the demand circle.

It is possible that a user may require more demands to be met than is possible with the available supply. In this situation, there is no configuration that of met and unmet demands that satisfies these constraints (that is, there is no solution). If the sorting-based fulfillment optimization method determines that it is not possible to fill all demands required to be met, the algorithm indicates an error condition. In one embodiment, in response to the detection that there is no solution, an alert indicating the absence of available configurations is presented in the user interface of the tool 800. For example, a pop-up alert may be displayed that states that there is no solution or that no configurations will satisfy the user's requirements.

The user may also remove a requirement that a demand be met or unmet by removing the requirement using the tool 800. For example, the tool 800 may receive a user removal of a requirement that a particular demand must be met or unmet by receiving a mouse click on a demand circle associated with the particular demand 905, displaying a menu 910 including an option to remove any requirement that the demand be met or unmet 940, receiving a mouse click indicating a selection 920 of the option removing the requirement 940, and storing the state of being without requirement by setting the respective must meet and must not meet flags to false. The tool 800 may further display a visual indication that the demand is not required to be met or unmet 945, for example by displaying the demand circle with the visual indications indicating that the demand is met or unmet, as shown and described with reference to FIG. 1.

The mouse clicks used for interactions with the tool may include a standard click, such as a left-click, and a variety of alternative clicks, such as a right-click or an option-click. The interactions with the tool may also include drag and drop operations, cursor hover, as well as keyboard or other text inputs.

In one embodiment, the "no-requirement" state as to whether a demand must be met or unmet is the default state of all demands. In another embodiment, one or more demands may have a default state of being required to be met or unmet, based on logic configured by the user of the tool 800. For example, a business may wish to always fill every order of a highly valued customer. The user may configure the tool 800 to configure demands associated with the highly valued customer to be in a default state of being required to be met, and the demand circles will be displayed by the GUI accordingly.

Referring again to FIG. 8, the tool 800 is shown in a configuration in which a user has marked two demands 805, 810 as required to be met, and one demand 815 as required to be unmet.

In one embodiment, the tool 800 includes a "reset configuration" button 820. In response to a selection of this button, the processor will revert each displayed supply and demand to the state and location it was in when first displayed.

In one embodiment, the tool 800 includes an "approve configuration" button 825. In one embodiment, selecting the "approve configuration" button 825 acts to select the currently displayed configuration for implementation by the operations management system. In response to a selection of this button, the processor will initiate processing the steps for automated implementation of schedules shown and described with reference to FIG. 7 in accordance with the schedule configuration displayed in the tool 800.

For example, the processor may generate and transmit one or more REST requests to a web interface server (such as web interface server 1245, as shown in and described with reference to FIG. 12). In one embodiment, the REST request is configured to include all changes indicated by the user's manipulation of the tool by the user, including, but not limited to, the approved configuration of met and unmet demands, the requirements that a demand be met or unmet, any change in schedule for a demand or supply, and change in priority given to a demand. In another embodiment, all changes indicated by the user's manipulation of the tool are submitted as REST requests as they are made by the user, and the rest request generated and transmitted in response to the selection of the approve configuration button is an approval of the changes made in these requests. In either case, the REST request is configured to cause the Web Interface Server 1245 and/or sorting-based fulfillment optimization server or module 1295 to direct the appropriate module(s) of the integrated business server 1240 to effect the changes indicated by the user's manipulation of the tool. In one embodiment, the appropriate modules of the integrated business server include the ERP module 1255, the inventory management and distribution module, the order processing module, and/or the supply chain management module. The specific format of requests transmitted to the server may vary based on implementation.

In one embodiment, multiple optimal solutions (constructed as shown and described in further detail below) may be presented using the tool 800. In one embodiment, the tool 800 includes a display of the number of solutions 830. This number represents the number of possible equally valid configurations with the same least number of unmet demands—that is, other optimal solutions. Each of these solutions is arbitrarily provided with a sequential number to act as an identifier for the solution, for example by assigning the numbers in sequence as each solution is identified. The displayed number of solutions 830 may be associated with previous solution button 835 and next solution button 840. An indicator number 845 that shows the identifier associated with the current solution is also displayed to inform the user which solution is currently being viewed. In response to a selection of the previous solution 835 button, the processor executes instructions to cause the configuration displayed in the tool to be replaced by a configuration assigned the next lower identifier number, and the indicator number 845 to be updated. In response to a selection of the next solution 840 button, the processor executes instructions to cause the configuration displayed in the tool to be replaced by a configuration assigned the next higher identifier number, and the indicator number 845 to be updated.

Figure 9B:
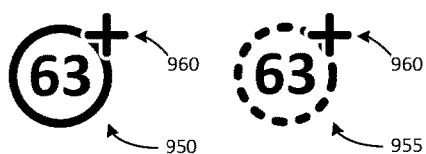
FIG. 9B illustrates enlarged views of example additional information about demands shown by the tool.

FIG. 9B illustrates enlarged views of example additional information about demands shown by the tool 800. In one embodiment, demand circles (or other icons) that indicate that a demand is met or unmet may include a further indication that they are involved in alternate solutions. For example, where the met demands are depicted with green-filled circles, a green-filled circle may be tinted toward yellow to indicate that in an alternate solution, the demand represented by this circle is unmet. Similarly, where the unmet demands are depicted with yellow-filled circles, a yellow-filled circle may be tinted toward green to indicate that in an alternate solution, the demand represented by this circle is met. In one embodiment, where met demands are depicted by circles with a continuous outline (such as met demand circle 950), and unmet demands are depicted by circles with a broken or dashed outline (such as unmet demand circle 955), the fact that a demand may have an opposite status in an alternate solution may be indicated by adding a further graphical indicator 960 to the circle representing that demand. The indication that a demand represented by a circle is involved in an alternate solution may also be applied to demands that are required to be met or to remain unmet by similar means. Thus, the user can readily see when viewing the tool 800 that a demand the user may have been worried about leaving unmet would be met in an alternate solution, and can assess the demands that would be left unmet in the alternate solution. The user can click through the various alternate solutions using the previous solution button 835 and next solution button 840 to arrive at one of the optimal solutions where the demand is met.

Figure 9C:
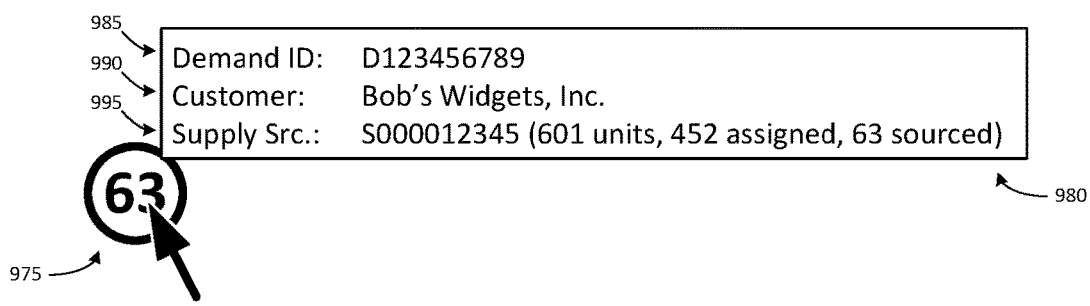
FIG. 9C illustrates enlarged views of example interactions with the tool to cause information about a particular example demand to be displayed.

FIG. 9C illustrates enlarged views of example interactions with the tool to cause information about a particular example demand to be displayed. In one embodiment, the tool 800 provides additional information about an example demand in response to interaction with an example demand circle (or other icon) 975 associated with the example demand. In one embodiment, the tool 800 may detect a mouse (cursor) hover over or receive a mouse click on the example demand circle 975 associated with the example demand. In response to the click or hover, the tool 800 displays a pop-up 980 that provides additional information about the example demand that may be useful to the user in evaluating a solution and determining whether the demand should be met or unmet. In one embodiment, the pop-up 980 may display a demand identifier number 985. Demand identifier number 985 uniquely identifies the example demand represented by demand circle 975. Demand identifier number 985 may also be associated with a purchase order or other document. The displayed demand identifier number 985 may act as a hyperlink to the purchase order or other document. In one embodiment, the pop-up 980 may display the name of a customer (or shipping destination) 990 associated with the example demand. The displayed name of the customer 990 may act as a hyperlink, which on mouseover or on mouse click will cause the tool 800 to highlight all demand circles associated with the customer. In one embodiment, the pop-up 980 may display one or more unique identifiers of the supply source (or sources) 995 that the example demand draws from. Further, statistics such as the size of the supply, the number of units of that supply which are assigned to demands, and the quantity of units sourced from the example demand from that supply may also be displayed. In one embodiment, detect a mouse hover over or receive a mouse click on the example demand circle 975 associated with the example demand, the tool 600 highlights all supply circles representing supplies that provide units to the example demand. In one embodiment, the pop-up 980 may display an indication of a priority level for the demand represented by demand circle 975. In one embodiment, the pop-up 980 may display the demand quantity for the demand represented by demand circle 975. In one example, this information may be retrieved from a database associated with integrated business server 1240.

Similarly, reciprocal information may be provided in response to detecting a mouse hover over or receiving a mouse click on a supply circle (or other graphical representation) associated with a particular supply. For example, in response to the hover or click interaction with the supply circle, the tool 800 may display a pop-up and/or highlight all demand circles that draw units from the particular supply. The pop-up may include such information as unique identifier for the particular supply, a vendor name, manufacturer name, or other description of the source of supply, the number of units assigned to demands and/or remaining un-assigned units, a date of origin for the supply, and a listing of one or more demands that draw units from the supply. The listing of demands may include further detail as to the quantity supplied to each demand. In one example, this information may be retrieved from a database associated with Integrated business server 1240.

In an example, the highlighting may be a brightening or change of the color of the supply/demand circle, or a boldening of the border of the circle. The supply to demand relationship may be one to many, many to many, many to one, or one to one, and the displayed highlights may reflect these relationships.

—Dynamic Graphical Schedule—

Referring again to process block 235, the processor arranges or controls display of a graphical representation of a schedule of supplies and met and unmet demands for the series of days in a graphical user interface. In one embodiment, the processor generates a graphical user interface such as tool 100 or tool 800 that shows the supplies and demands associated with each day in the series of days (or the timeframe), and in one embodiment further shows the demands associated with each priority level.

Figure 10:
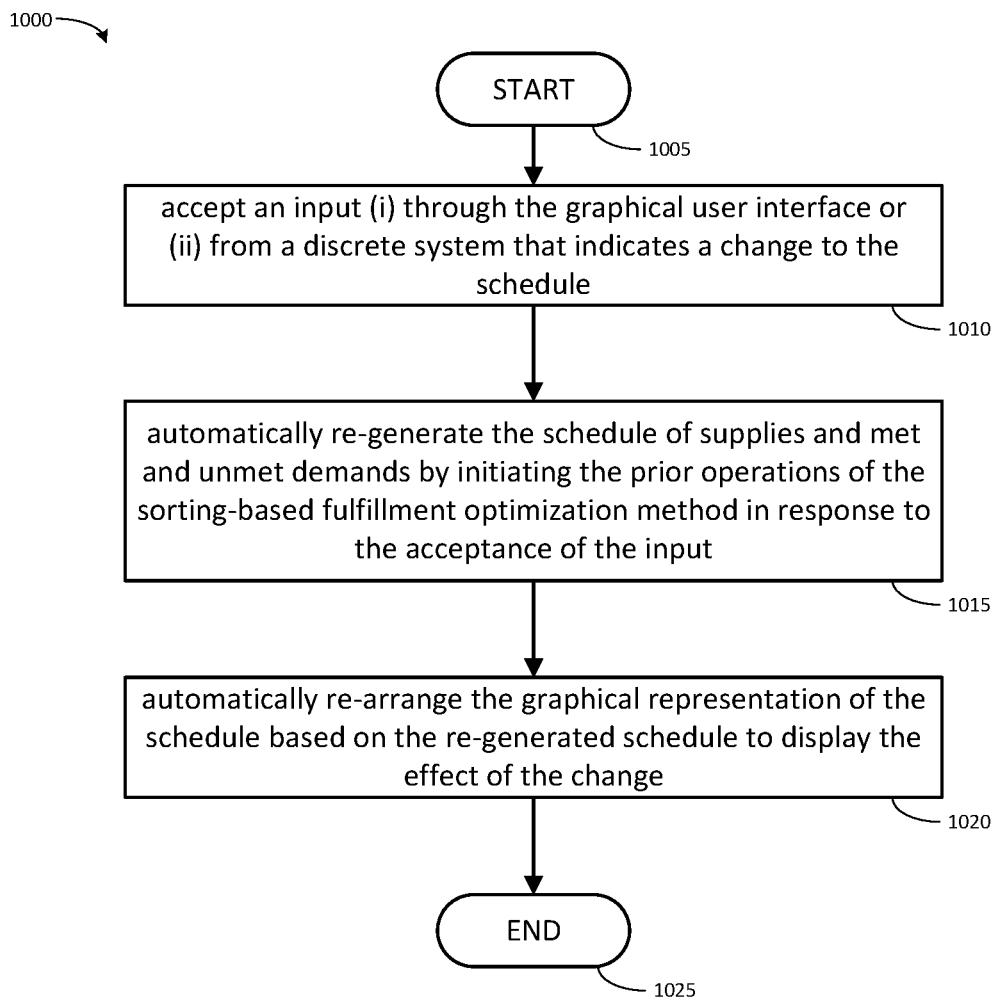
FIG. 10 illustrates one embodiment of a method for operating a graphical scheduling tool associated with sorting-based assignment to optimize order fulfillment in short supply situations.

FIG. 10 illustrates one embodiment of a method 1000 for operating a graphical scheduling tool (such as tool 100 or tool 800) associated with sorting-based assignment to optimize order fulfillment in short supply situations. The method 1000 initiates based on various triggers, such as receiving a signal over a network or parsing stored data indicating an input has been presented to the tool through a graphical user interface. In one embodiment, method 1000 is performed as part of a larger process, such as method 200 as shown and described with reference to FIG. 2. The method 1000 initiates at START block 1005 and proceeds to process block 1010.

At process block 1010, the processor accepts an input either (i) through the graphical user interface or (ii) from a discrete system that indicates a change to the schedule. In one embodiment, where the inputs come through the graphical user interface, the user may perform drag-and-drop, click, or other mouse or keyboard input operations on visual representations of the demands (or demand icons) or visual representations of the supplies (or supply icons). These operations may operate to move supply icons or demand icons between days and/or priority levels within the schedule, require demands to be met or remain unmet, delete, add, or modify demands and supplies, or perform other operations. The processor detects the updates to the values of the supply object or demand object indicated by the manipulation of the associated supply icon or demand icon. The processor writes the updated values to appropriate fields of the supply object or demand object.

In one embodiment, where the inputs come from another system discrete, remote, or separate from the system (such as tool 800), the inputs may include a message (such as a REST request) instructing the system to move supply icons or demand icons between days and/or priority levels within the schedule, require demands to be met or remain unmet, delete, add, or modify demands and supplies, or perform other operations. The processor detects the updates to the values of the supply object or demand object described by the message by parsing the message for the instructions. The processor then writes the updated values to appropriate fields of the supply object or demand object in accordance with the parsed instructions.

In one embodiment, the system is configured to accept, through the graphical user interface or from other systems, inputs that indicate a change to the schedule including each of (i) an indication that a particular demand is required to be met, (ii) an indication that a particular demand is required to be unmet, (iii) an indication that a particular demand or supply is moved from one day to another, (iv) an indication that a particular demand is moved from one priority level to another, (v) an indication that a particular demand or supply is deleted, and (vi) a set of one or more inputs that describe addition of a new demand or supply.

When the processor has thus completed accepting an input through the graphical user interface that indicates a change to the schedule, process block 1010 completes, and processing continues to process block 1015.

At process block 1015, the processor automatically re-generates the schedule of supplies and met and unmet demands by initiating (i) the identification of the distributions, (ii) the sorting of all demands, (iii) the selection of an initial distribution and generation of an indication of whether the demand can be filled for each demand, in response to the acceptance of the input. In one embodiment, the graphical user interface will automatically reevaluate the optimal configuration of the schedule in a dynamic manner. Thus, operations (i)-(iii) of the sorting-based fulfillment optimization method are re-performed based on the updated data caused by the user input. In one embodiment, the processor identifies distributions, sorts demands, and selects initial distributions and generates indications of whether demands can be filled in substantially the same way as shown and described elsewhere herein. When the processor has thus completed automatically regenerating the schedule of supplies and met and unmet demands, processing at process block 1015 completes, and processing continues to process block 1020.

At process block 1020, the processor automatically re-arranges the graphical representation of the schedule based on the re-generated schedule to display the effect of the change. In one embodiment, following execution of operations of a sorting-based fulfillment optimization method (such as operations (i)-(iii) discussed with reference to process block 1015), the processor operates to re-generate the schedule from the updated underlying data objects.

For example, the processor retrieves from each demand object: (i) a ship date for the demand, (ii) a demand size for the demand, (iii) a priority level of the demand (if applicable), and (iv) a value of a flag indicating whether or not the demand can be completely satisfied. Based on the retrieved values, the processor automatically arranges or controls visual representations of the demands (or demand icons) within the graphical representation of the schedule. The demand icon is displayed in the date indicated by the retrieved ship date. The demand icon also displays the retrieved demand size. The demand icon is displayed in the priority indicated by the retrieved priority level. The demand icon is shown as met or unmet in response to the retrieved flag value. Further, the values of the must meet and must not meet flags may be retrieved from each demand object, and the demand icon is shown as required to be met or required to be unmet in response to the retrieved flag value. In a similar fashion, the processor retrieves from each supply object (i) an arrival date for the supply and (ii) a supply size for the supply. Based on the retrieved values, the processor automatically arranges or controls the visual representations of the supplies (or supply icons) within the graphical representation of the schedule. When the processor has thus completed automatic rearrangement of the graphical representation of the schedule based on the re-generated schedule to display the effect of the change, processing at process block 1020 completes, and processing continues to END block 1025, where process 1000 ends.

Thus, in one embodiment, the user may drag and drop supply and demand icons between days and/or priority levels within the schedule, require demands to be met or remain unmet, delete, add, or modify demands and supplies, or perform other operations, and the graphical user interface will automatically reevaluate the optimal configuration of the schedule in a dynamic manner. The graphical representation of the schedule dynamically responds to user inputs by re-executing the sorting-based fulfillment optimization method and generating a new optimized schedule in view of the inputs. The tool thereby presents an optimal schedule of met and unmet demands that minimizes unmet demands in response to a wide variety of user input changes. This dynamism is enabled by the greatly improved efficiency in operating speed and compute resource utilization of the systems and methods described herein.

In one embodiment, the graphical user interface is generated and arranged on a server-side or cloud computing device, and transmitted to a computing device for display, for example by a client (such as clients 1305). Additional details of the graphical user interface are described elsewhere herein, for example with reference to FIGS. 13 and 14A-14C.

—Multiple Optimal Solutions—The algorithm described above will find an optimal solution in terms finding a schedule with a minimum number of unmet demands for a given source of supply. But, a user of the assignment system may wish to see all equally optimal solutions. The algorithm may instead be modified to construct a set of all optimal solutions.

Example pseudo code for obtaining a list of multiple optimal ways to meet the demands in an optimal solution is presented here:

```
01    //Get a list of all the ways to meet Demands in an optimal solution.
02    //@return the list of options
03
04    //Note this code uses the following variable, set up and defined
05    //elsewhere:
06    //              demands                   a List of Demand objects for the given problem
07
08    List<Set<Demand>> getMultipleOptimalSolutions( ) {
09
10                    int nPriorities = 4;
11
12                    //Deal with user defined constraints:
13                    removeUserConstrainedUnmet(demands);
14                    fillAndRemoveUserConstraintedToBeMet(demands);
15                    //The supplies have been depleted to handle the constraints and
16                    //all constrained demands are now removed from the demands
17                    //list.
18
19                    //Now comes the usual way to find which demands are met, using
20                    //the optimization method described above: the method honors
21                    //priorities when deciding which demand to meet.
22                    List<Demand> metDemands = assignSupplyToDemand(demands);
23
24                    //The example metDemands represent one optimal way to meet
25                    //Demands, but others could be possible too.
26
27                    //We start with a new empty Map to hold all the sets of equal-
28                    //sized demands, and a count of how many met demands were in
```

```
29    //that set.
30    Map<Set<Demand>, Number> demandSetCountMap = new HashMap<>( );
31
32    //A new empty list which will hold all the sets of equal-sized
33    //demands
34    List<Set<Demand>> demandSets = new ArrayList<>( );
35    for (int pri = 1; pri <= nPriorities; pri++) {
36        //sets are made of demands of the same size and priority
37        List<Set<Demand>> eqSizes =
38            createSetsOfEqualSizedDemandForPriority(pri);
39        //now just add all those sets into the one giant
40        //collection, demandSets.
41        demandSets.addAll(eqSizes);
42    }
43
44    for (Set<Demand> s : demandSets) {
45        //How many demands in s are met?
46        Number nMetDemands = s
47            .stream( )
48            .filter((d) -> metDemands.contains(d))
49            .count( );
50        //record the set and its count of met demands.
51        demandSetCountMap.put(s, nMetDemands);
52    }
53
54    //With the completed demandSetCountMap we have everything
55    //needed to construct the other solutions which will be
56    //equivalent to the original optimal solution.
57    //The agenda is to now build the alternative sets of met
58    //demands, and put them together in all possible ways.
59    List<List<Set<Demand>>> possibles = new ArrayList<>( );
60
61    for (Set<Demand> s : demandSetCountMap.keySet( )) {
62        Number nMet = demandSetCountMap.get(s);
63        if((int)nMet != 0){
64            List<Set<Demand>> combinations =
65                getSizeNSubsets(nMet, s);
66            //s is a set of equal sized Demands. If s is
67            //{A, B, C} and nMet is 2, then the "combinations"
68            //list contains {A, B}, {A, C}, and {B, C}
69            possibles.add(combinations);
70        }
71    }
72
73    sortByPriorityAndSize(possibles);
74
75    //Each element in the following list might be a way to meet
76    //demands, equivalently optimal to the original.
77    //The only question is if the supply works out for each.
78    List<List<Set<Demand>>> metDemandsCandidates =
79        choseOneSetFromEachElement(possibles);
80
81    //return the metDemandsCandidates filtered out those for whom
82    //supply is insufficient.
83    //Note the List<List<Set<Demands>>> is "flattened" into
84    //a simple List<Set<Demand>>
85    return metDemandsCandidates
86        .stream( )
87        .filter((list) -> canSupplyTheseDemands(list))
88        .flatMap(Collection::stream)
89        .collect(Collectors.toList( ));
90 }    //The end of function getMultipleOptimalSolutions( )
91
92 boolean canSupplyTheseDemands(List<Set<Demand>> listOfSetsOfDemands)
93 {
94        //The following is a way to "flatten"
95        //a collection of collections of items
96        //into a simple collection of all the items.
97        List<Demand> listOfDemands = listOfSetsOfDemands
98            .stream( )
99            .flatMap(Collection::stream)
100           .collect(Collectors.toList( ));
101
102       //Now see if all the given demands can be met.
103       Return assignSupplyToDemand(listOfDemands).size( )
```

```
104                        == listOfDemands.size( );
105          }
```

The example pseudo code above describes one or more computer-implemented methods that may be performed by a processor of one or more computing devices (i) accessing memory and (ii) configured with logic to cause the system to execute the step of the method, as described above. As above, lines beginning with "//" are comments to the example code. For reference, the syntax List<Demand> means "the following variable is a list of Demand objects." As can be seen above, the code involves collections of collections, and even collections of collections of collections (like List<List<Set<Demand>>> for example). Also, for reference, the syntax map<A, B> means a map object containing keys of type A and values of type B. In a map, as discussed above, for every key A there is one value B. In one embodiment, the pseudocode could be implemented as Java® code.

Figure 11A:
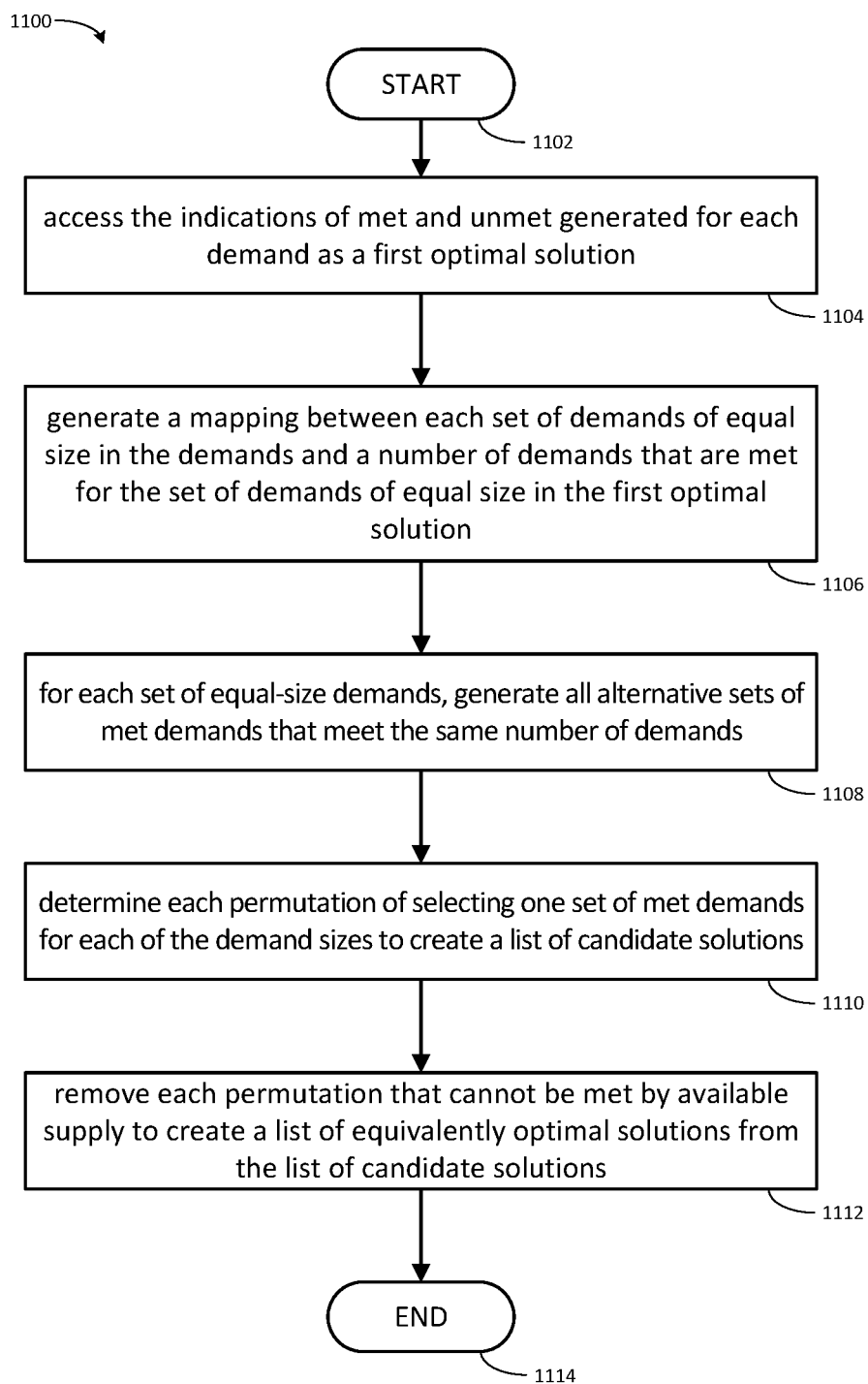
FIG. 11A illustrates one embodiment of a method for generating multiple ways to meet demands with an optimal solution associated with sorting-based assignment to optimize order fulfillment in short supply situations.

FIG. 11A illustrates one embodiment of a method 1100 for generating multiple ways to meet demands with an optimal solution associated with sorting-based assignment to optimize order fulfillment in short supply situations. The method 1100 initiates based on various triggers, such as receiving a signal over a network or parsing stored data indicating that multiple optimal solutions are to be collected. In one embodiment, method 1100 is performed as part of a larger process, such as method 200 as shown and described with reference to FIG. 2.

In one embodiment, the example pseudo code above describes a function, getMultipleOptimalSolutions( ), for generating multiple ways to meet demands with an optimal solution. The function getMultipleOptimalSolutions( ) is one example implementation of method 1100. The function returns a list of all the options for meeting demands that result in an optimal solution. Each option describes a set of demands that are met. As noted at line 06 of the pseudo code, the code uses a variable "demands" which is a list of Demand objects for the given problem (in other words, the "demands" list the list of Demand objects for the timeframe under consideration). Accordingly, at line 08 of the pseudo code, the function getMultipleOptimalSolutions( ) is defined to return a list of sets of demands. In operation, the sets of demands included in the list will be those sets that can be met and still maintain an optimal solution.

In one embodiment, certain preprocessing functions may occur before the method 1100 that are not handled by the method 1100, including, for example, (i) setting the number of priority levels in the system, and (ii) processing user-defined constraints to meet or leave unmet demands.

At line 10 of the pseudo code, a variable "nPriorities" representing the number of priority levels in the system is set to 4. The number of priorities can be any integer number greater than or equal to 1, although large numbers of priority levels (for example, numbers greater than 10) may be unnecessarily fine-grained. In practice, four priority levels has been found to be suitable.

At lines 13-14 of the pseudo code, user-defined constraints on particular demands are addressed. First, at line 13, a function to remove from the demands list demands that are indicated by users as required to be unmet is called: removeUserConstrainedUnmet(demands). Because these demands are removed from the list, they will not be included in the subsequent attempt to fill the listed demands, and will therefore remain unmet. In one embodiment, the Demand objects for the demands required to remain unmet are removed from the demands list. In one embodiment, each demand object in the list of demands is parsed to determine if a flag is set that indicates that the demand associated with that demand object is required to be unmet. If that flag is set, the demand is removed from the list of demands.

Second, at line 14, a function to fill and remove from the demands list demands that are indicated by users as required to be met is called: fillAndRemoveUserConstraintedToBeMet(demands). In this function, the demands are filled out of available supply, the available supply is reduced accordingly, and the filled demands are removed from the demands list. In one embodiment, the fill-and-remove function includes the functions of the tryFill method described above, for example, executing the tryFill method for each of the set of demands required to be met. If it is not possible to fill all demands marked required, an error message will be presented. If it is possible to fill all demands marked required, the demands will be filled before the remaining unconstrained demands are evaluated. Because the demands marked required are already filled and removed from the list, they will not be included in the subsequent attempt to fill the listed demands. Further, the available supply is depleted to the extent that the required demands are filled before supplies are assigned to the remaining unconstrained demands, and so supply assigned to the required demands will not be assigned to unconstrained demands.

In one embodiment, each demand object in the list of demands is parsed to determine if a flag is set that indicates that the demand associated with that demand object is required to be met. If that flag is set, the demand object is removed from the list and added to a second list of demands that have been determined to be required to be met. Once all demands in the list that are required to be met are placed in the second list, the processor sorts the second list in ascending order of size of demands and executes the tryFill method for each demand in the second list. If all demands in the second list can be met, the operation to fill and remove demands constrained to be met succeeds and all demands required to be met are removed from the list of demands, and available supply is reduced accordingly. If all demands in the second list cannot be met, the operation to fill and remove demands constrained to be met fails, and the demand objects in the second list are re-inserted into the demands list, the available supply is not reduced, and an error message indicating the inability to fill all required demands may be transmitted or displayed.

Note that the order of addressing the user-defined constraints is not important, as long as they are addressed before the unconstrained demands are evaluated. Thus, in one embodiment, the function to fill and remove demands that are user-constrained to be met may be executed before the function to remove demands that are user-constrained to be unmet.

FIG. 11B illustrates a simple example problem 1120 used for illustrating one embodiment of a process for finding multiple optimal solutions. The process for finding multiple optimal solutions described in the getMultipleOptimalSolutions( ) pseudo code will be applied to the example problem 1120. The example problem 1120 includes demands 1122 in two distributions, distribution 1 1124 and distribution 2 1126, and in two priority levels, priority 1 1128 and priority 2 1130. The example problem 1120 does not have any user defined constraints requiring any particular demands to be met or remain unmet. Each distribution in the example problem 1120 also includes an associated source of supply 1132 which may be assigned to meet demands 1122.

Referring to FIG. 11A, the method 1100 initiates at START block 1102 and proceeds to process block 1104. At process block 1104, the processor accesses the indications of met and unmet generated for each demand as a first or initial optimal solution. In one embodiment, the indications of met and unmet demands are generated as shown and described with reference to FIGS. 2 and 4 herein. These initially created met and unmet demand indications describe a first optimal solution, to which there may be alternatives. At line 22 of the pseudo code, a function to determine one optimal way that demands can be met is called: assignSupplyToDemand(demands), and the resulting list of met demands is stored as the value of variable metDemands. In one embodiment, the assignSupplyToDemand(demands) function sorts the demands from small to large—in ascending order of size of demand—and then calls the tryFill method for each demand in the list of demands. In one embodiment where there are two or more priority levels, the assignSupplyToDemand(demands) function sorts the demands from small to large, and further sorts each set of equal-sized demands from later to earlier—in descending order of demand date—and then calls the tryFill method for each demand in the list of demands. Thus, the assignSupplyToDemand(demands) function generates one optimal way (an initial or first optimal solution) that the demands can be met. The final value of met demands provides an indication of what demands are met and what demands are unmet in one optimal solution. The processor accesses the final value of met demands to obtain the first optimal solution. Once the processor has thus completed accessing the indications of met and unmet generated for each demand as a first or initial optimal solution, processing at process block 1104 completes, and processing continues to process block 1106.

FIG. 11C illustrates one optimal solution 1134 (the initial optimal solution) to the example problem 1120 found by the application of process block 1104. Application of the tryFill ( ) method to each of the demands in ascending order of demand size (and in one embodiment to each set of equal-sized demands in descending order of demand date) results in demands C, D, F, G, K, and L 1136 being met, and demands A, B, E, H, I, and J 1138 remaining unmet. The final value of the variable metDemands 1140 includes the demand objects for demands C, D, F, G, K, and L 1136.

Referring again to FIG. 11A, at process block 1106, the processor generates a mapping between each set of demands of equal size in the demands and a number of demands that are met for the set of demands of equal size in the first optimal solution.

While the assignSupplyToDemand(demands) function at line 22 of the pseudo code generates an initial optimal way that the demands can be met, other optimal ways to meet the demands could also be generated. The initial optimal way provides a basis for generating all other optimal ways that demands can be met from available supply. The initial optimal way indicates how many of each size of demand can be met by the available supply. For example, where there are three demands of size 5 as shown in example problem 1120, and two of them are met in the initial optimal way as shown in one optimal solution 1134, it holds true that only two of those three demands can ever be met in an optimal solution, as shown and described in the proofs of optimality above. More generally, where there are N demands of size X, and M of them are met in the initial optimal way, it holds true that at most M of those N demands of size X can ever be met in an optimal solution. Thus M is an upper bound for the number of met demands among the N demands.

Thus, in one embodiment, to determine all optimal solutions, all sets of equal sized demands may be associated with an upper bound for the count of how many demands can be met of the equal-sized demands. This association can be determined from the initial optimal solution.

In one embodiment, at line 30 of the pseudo code, a new, empty map object to hold each set of equal-sized demands in association with a count of how many of those demands are met—demandSetCountMap—is created. At line 34 of the pseudo code, a new, empty list to hold all the sets of equal sized demands—demandSets—is created.

Where there are multiple priority levels associated with the demands, there may be sets of equal-sized demands for each priority level. For example, where there are two priority levels, and there are demands of size 5 at both priority levels, there will be two sets of demands of size 5: a set for the first priority level, and a set for the second priority level. Both of these demand sets will be added to the list of sets of equal sized demands, demandSets.

At lines 35-42 of the pseudo code, sets of equal-sized demands are gathered for each priority level and added to the list of sets of equal sized demands, demandSets. The sets of equal sized demands are gathered for each demand priority level, as indicated by the for-loop that iterates initially through the highest priority level (pri=1), and increases the priority on each iteration (pri++) until the loop has been performed for the each possible priority level (pri<=nPriorities), as shown at line 35.

Within the loop, a list of sets of demands, eqSizes, is initiated and assigned the values of all sets of equal-sized demands for the current priority level in the loop, as shown at lines 37-38 of the pseudo code. The sets of equal sized demands for the current priority level are extracted from the list of demands by the function createSetsOfEqualSizedDemandForPriority(pri). In one embodiment, this function parses the list of demands (excluding demands constrained to be met or unmet) for all demand objects having priority pri. When a demand object having priority pri is located, the demand size is extracted from the demand object. The demand size is evaluated to determine whether there exists a set of demands of that size. If there is a set for demands of that size, the demand object is added to that set. If there is no set for demands of that size, a set for that size of demands is created, and the demand object is added to that set. Once the demands list is traversed and all demands examined, all sets of same-sized demands are added to a list, and that list is returned. The returned list is assigned as the value of eqSizes, as shown at lines 37-38 of the pseudo code. The list of same-sized demands for the current priority is then added to the overall list of same-sized demands, demandSets, as shown at line 41 of the pseudo code. The loop then iterates to the next priority level. Higher priority levels are considered before lower priorities because allocating to some of the sets of equal-sized demands in lower priority levels before allocating to the higher priority levels may consume supply needed by the higher priority levels.

At lines 44-52 of the pseudo code, for each set of equal-sized demands in the list of equal-sized demand sets, the number or count of met demands in the set of equal-sized demands is determined, and the set of equal sized demands and the number of equal-sized are added to the map as key and value. In one embodiment, a for loop that iterates for each set of equal sized demands s belonging to the set of equal-sized demands sets demandSets is implemented, as shown at lines 44-52. The number of met demands nMetDemands in the current demand set s (for the present iteration of the for loop) is assigned the value of a count of the demands in demand set s that also belong to the list of met demands metDemands generated at line 22. For example, this may be done by counting the streamed demand objects d of the current demand set s that have been filtered to include only those demand objects d that are also contained in the list of met demands metDemands, as shown at lines 46-49 of the pseudo code. The set of equal-sized demands s and the count of demands that are met nMetDemands are put into the map of demand sets and associated counts of met demands, demandSetCountMap, as a key-value pair, as shown at line 51. The for loop then iterates for the next set of demands in the list of sets of equal-sized demands until all sets of equal-sized demands in the list are processed. The map demandSetCountMap then includes a listing of the number of demands that can be met for each set of equal-sized demands in the list of demands. The completed map demandSetCountMap is thus a mapping between each set of demands of equal size in the demands and a number of demands that are met for the set of demands of equal size in the first optimal solution. With the completion of the map of demand sets and associated counts of met demands, demandSetCountMap, all other combinations equivalent to the original optimal solutions can be constructed.

Once the processor has thus completed generating a mapping between each set of demands of equal size in the demands and a number of demands that are met for the set of demands of equal size in the first optimal solution, processing at process block 1106 completes, and processing continues to process block 1108.

FIG. 11D illustrates the contents of the map 1140 generated by process block 1106 for the example problem 1120. There is a mapping between each set of equal-sized demands (demandSets) and the number of met demands in that set (nMetDemands) at each priority level. In particular, there are: (i) a mapping 1141 between all priority 1 demands of size 1 and the number, 1, of met demands of that size among the metDemands 1140; (ii) a mapping 1142 between all priority 1 demands of size 3 and the number, 1, of met demands of that size among the metDemands 1140; (iii) a mapping 1143 between all priority 1 demands of size 4 and the number, 0, of met demands of that size among the metDemands 1140; (iv) a mapping 1144 between all priority 1 demands of size 5 and the number, 2, of met demands of that size among the metDemands 1140; (v) a mapping 1145 between all priority 2 demands of size 1 and the number, 1, of met demands of that size among the metDemands 1140; (vi) a mapping 1146 between all priority 2 demands of size 2 and the number, 1, of met demands of that size among the metDemands 1140; and (vii) a mapping 1147 between all priority 2 demands of size 4 and the number, 0, of met demands of that size among the metDemands 1140. Note that there are no entries in the map for demand sizes that have no associated demands. For example, there is no key-value pair in the map for priority 1 demands of size 2, because there are no such demands in the example problem. Also, note that the map does not consider what distribution the demand belongs to. Distribution is not yet relevant at this stage of the process.

Referring again to FIG. 11A, at process block 1108, for each set of equal-size demands, the processor generates all alternative sets of met demands that meet the same number of demands.

In one embodiment, the alternative sets of met demands that satisfy the same number of demands are created by creating the set of all ways to choose the number of met demands from the set of equal-sized demands for all sets of met demands. This yields a list of alternative sets of met demands of size N-choose-M for each set of equal sized demands, where N is the number of demands of the same size in the set of equal-sized demands and M is the number of met demands for the set of equal sized demands. In one embodiment, these values can be derived from the mapping. The resulting list of all alternative sets of met demands that satisfy the same number of demands in each set of equal-size demands may take the form of a list of lists of sets of demands.

In one embodiment, at line 59 of the pseudo code, a new list of possible combinations, 'possibles,' is initialized. The list of possible combinations is the list of all possible combinations of met demands for each set of equal-sized demands, given the number of met demands in the set. For each set of equal-sized demands of size X, there will be X choose Y combinations added to the 'possibles' list, where Y is the number of met demands for the set of equal sized demands. The list of possible combinations is filled at lines 61-71 of the pseudo code.

In one embodiment, a for loop that iterates through each set of equal-sized demands in the map demandSetCountMap, as shown at lines 61-71 of the pseudo code. For each set of equal-sized demands s, the number of met demands nMet in the set is retrieved, as shown at line 62 of the pseudo code. The value at the key s in the map demandSetCountMap, which is the count of met demands in that key s (set of equal-sized demands). If there is a met demand in the set of equal sized demands s, in other words, where the number of met demands nMet does not equal zero, then (i) the possible combinations are generated, and (ii) the retrieved combinations are added to the list of possible combinations of met demands, 'possibles,' as shown at lines 63-70. In one embodiment, the set of possible combinations are generated using a function that returns all possible subsets of a certain size from a set: getSizeNSubsets(size, set). As shown at lines 64-65, the function is passed the arguments the number of met demands, nMet, as the size, and the current set of equal-sized demands s as the set. In one embodiment, the returned set of possible combinations is added to the list of possible combinations, for example by appending the returned set to the end of the 'possibles' list as shown at line 69. At the completion of the for loop shown at lines 61-71, the list of all possible combinations of met demands for each set of equal-sized demands given the number of met demands in the set, 'possibles,' is fully populated.

In one embodiment, the fully populated 'possibles' list is sorted by priority level, from first (highest) priority to last (lowest) priority, and within each priority the demands are sorted by size from smallest demand to largest demand in ascending order. At line 73 of the pseudo code, a function to perform these sorts is called: sortByPriorityAndSize(possibles). This places the 'possibles' list in the proper order for consideration when selecting each permutation of one set of met demands for each of the demand sizes. This sorting ensures that the 'metDemandsCandidates' list (described below) will be in the proper order for determining if demands can be filled. If the order is not correct, larger or lower priority demands may be filled at the expense of smaller or higher priority demands, resulting in non-optimal solutions.

Once the processor has thus completed, for each set of equal-size demands, generating all alternative sets of met demands that meet the same number of demands, processing at process block 1108 completes, and processing continues to process block 1110.

FIG. 11E illustrates the contents of the list of all alternative sets of met demands that satisfy the same number of demands in each set of equal-size demands (the 'possibles' list) 1150 generated by process block 1108 for the example problem 1120. Here, example 'possibles' list 1150 is a list of five lists of sets of demands. The first list 1151 in example 'possibles' list 1150 includes a set of only one demand, demand D, because that is the only way to choose one demand from the set containing only demand D. The second list 1152 in example 'possibles' list 1150 includes a set containing demand B and a set containing demand C, because those are the two possible ways to choose one demand from the set containing demands B and C. The third list 1153 in example 'possibles' list 1150 includes a set containing demands E and F, a set containing demands E and G, and a set containing demands F and G, because those are the three possible ways to choose two demands from the set containing demands E, F, and G. The fourth list 1154 in example 'possibles' list 1150 includes a set of only one demand, demand K, because that is the only way to choose one demand from the set containing only demand K. The fifth list 1155 in example 'possibles' list 1150 includes a set containing demand H, a set containing demand I, and a set containing demand L, because those are the three possible ways to choose one demand from the set containing demands H, I, and L. Note that example 'possibles' list 1150 contains no lists of possible ways to choose zero demands from a set, for example as indicated by mapping 1143 shown and described with respect to FIG. 11D. Alternatively, empty sets could be included in example 'possibles' list 1150 for equal-sized demand sets where no demands are satisfied.

Referring again to FIG. 11A, at process block 1110, the processor determines each permutation of selecting one set of met demands for each of the demand sizes to create a list of candidate solutions.

In one embodiment, after the list of all possible combinations of met demands for each set of equal-sized demands given the number of met demands in the set (the 'possibles' list) is created, a list of candidate equivalently optimal solutions is then generated, as shown at lines 78-79 of the pseudo code. In one embodiment, the value of the list of sets of demands 'metDemandsCandidates' is set to be equal to the value returned by the function chooseOneSet-FromEachElement(possibles). This function generates all candidate equivalently optimal solutions by assembling a list of all discrete ways to meet the number of met demands in each set of equal-sized demands. In other words, this function assembles a collection of all the ways to choose one way to meet the number of met demands in each set of equal sized demands. In one embodiment, the chooseOneSet-FromEachElement(possibles) function is a recursive function. The function (i) removes the first element from the list of all possible combinations of met demands for each set of equal-sized demands given the number of met demands in the set, 'possibles,' and (ii) combines each of the sets in that element with the result of recursively executing the function on the reminder of the list 'possibles.' The recursion would cease when the list 'possibles' is empty or null. This results in a complete list of candidate equivalently optimal solutions, 'metDemandsCandidates.' The candidate solutions may or may not be valid. If the candidate solutions can be met with available supply, these solutions are valid solutions equivalently optimal to the initial optimal solution.

Once the processor has thus completed determining each permutation of selecting one set of met demands for each of the demand sizes to create a list of candidate solutions, processing at process block 1110 completes, and processing continues to process block 1112.

FIG. 11F illustrates contents of the list of candidate equivalently optimal solutions (the 'metDemandsCandidates' list) 1160 generated by process block 1110 for the example problem 1120. The candidate equivalently optimal solutions are the permutations of the choosing one set from each list of sets in example 'possibles' list 1150. Each permutation of is created and added to the example 'metDemandsCandidates' list 1160. There are 18 possible permutations for example problem 1120. Each permutation is a list including five sets, one for each list of sets in example 'possibles' list 1150. FIG. 11F shows the first 1161, second 1162, and eighteenth 1163 of them. First permutation 1161 shows the selection of the first set in each list in example 'possibles' list 1150. Second permutation 1162 shows the selection of the second set of the second list 1163 in example 'possibles' list 1150, and first set in each other list in example 'possibles' list 1150. The algorithm continues as described for process block 1110, incrementally selecting one different set from one list of in example 'possibles' list 1150. Final permutation eighteen 1164 shows the selection of the last set in each list in example 'possibles' list 1150. Thus, 18 candidate equivalently optimal solutions are included in 'metDemandsCandidates' list) 1160.

Referring again to FIG. 11A, at process block 1112, the processor removes each permutation that cannot be met by available supply to create a list of equivalently optimal solutions from the list of candidate solutions.

Each candidate equivalently optimal solution may be a way to meet the demands that is equivalently optimal to the initial optimal solution generated at line 22 of the pseudo code. But, some of the candidate solutions are not performable because one or more sources of supply for the solution are not yet available to fill the demand because the source is not yet created or delivered. In other words, one or more demands in the solution are assigned supply from the future, rather than from a source of supply that is presently available. If a demand requires more supply than is presently available, the configuration of that candidate solution can't be solved, and the candidate solution can be discarded. By removing such non-performable solutions, the set of candidates is winnowed down to a set of performable solutions, each with the same count of met demands, with the same amount of supply excess, and each an optimal solution. Accordingly, in one embodiment, these non-performable solutions are removed from the list of candidate equivalently optimal solutions, 'metDemandsCandidates,' as shown at lines 81-89 of the pseudo code.

At lines 85-89 of the pseudo code, the list of candidate equivalently optimal solutions, 'metDemandsCandidates,' is filtered to exclude those candidates that are not viable, as indicated by a determination that the supply is not sufficient. For example, this can be performed by collecting the streamed set objects set from the 'metDemandsCandidates' (lines 85-86), filtered to include only those sets where the demands can be supplied (line 87) and flattened from a list of lists of sets of demands into a simple list of sets of demands (line 88), into a list of viable equivalently optimal solutions, Collectors (line 89), as shown at lines 85-89 of the pseudo code.

The filter to include only viable sets where the demands are capable of being met may be implemented by calling the Boolean function canSupplyTheseDemands(list) for the list of each streamed set of demands, and including the set only when the function is true. Initially, the canSupplyTheseDemands(list) flattens the set of lists of sets of demands provided as an argument into a simple list, as shown at lines 97-100 of the pseudocode. Then, the canSupplyTheseDemands(list) function determines whether the size of the flattened list of met demands using the assignSupplyToDemand( ) on the flattened list is the same as the size of the flattened list, as shown at lines 103-104 of the pseudo code. In short, the function checks to see if all demands can be met in a list of demands that are expected to all be able to be met. As long as the two list sizes are equal, all demands in the list can be supplied by available supply, and the function returns true. If the size of the list of demands that can be met with available supply is smaller than the size of the list provided, then one or more demands in the list cannot be met by available supply, and the function returns false.

As indicated at line 89 of the pseudo code, the filtered list that contains only viable equivalently optimal solutions, Collectors, is returned as the result of the function getMultipleOptimalSolutions( ). All possible equivalently optimal solutions can thus be constructed.

Once the processor has thus completed remove each permutation that cannot be met by available supply to create a list of equivalently optimal solutions from the list of candidate solutions, processing at process block 1112 completes, and processing continues to END block 1114, where process 1100 ends.

All the equivalently optimal solutions may be presented as alternative solutions for review by the user. For example, a user may step through the alternative solutions using the controls 835 and 840 in the GUI 800 shown and described with reference to FIG. 8. In response to user input requesting review of one of the alternative solutions, the processor may retrieve and display in the GUI 800 a set of met and unmet demands from the requested alternative solution. —Some Additional Example Advantages—

Traditional systems and methods for identifying combinations of met and unmet demands, which may, for example, employ a simplex algorithm or a commercial solver such as Gurobi, are computationally costly and slow. These limitations prevent traditional methods from being used in an interactive capacity to explore modifications "what-if" scenarios of met and unmet demand combinations—the limitations of traditional systems and methods prevent a user from seeing the results of a proposed "what-if" scenario substantially in real-time. Note that in tests, the systems and methods described herein performed thousands of times faster than the simplex method.

Also, traditional systems and methods for identifying combinations of met and unmet demands can rapidly exhaust memory resources, because the memory requirements can grow factorially as the number of demands to evaluate grows linearly (due to the combinatorial nature of this problem). Further, the traditional methods and systems do not readily accept constraints such as requiring a certain demand to be met or unmet. Additionally, the traditional systems and methods will provide only one 'best' solution, even though there may be alternative, equally good solutions that a user may want to evaluate.

The systems and methods presented herein resolve each of these problems. The systems and methods presented herein enable quickly finding one or more minimal cost assignments to a given set of demands using a given set of arriving supplies, making the method suitable for quickly repeated performance to allow a user to explore the effect of rearranging supplies and/or demands (investigating "what-if" scenarios). Further, the systems and methods presented herein are easily adapted to express constraints such as requiring a certain demand to be met or unmet. Additionally, the systems and methods presented herein are able to present alternative valid solutions. Further, the systems and methods described herein causes increased computer accuracy in assignment of supplies to minimize unmet demands, for example over common greedy assignment algorithms, which provide poor accuracy when tasked with such minimization.

Each of these improvements and advantages is enabled by the operation of the systems and methods described herein, and not by simple brute force application of computing resources or mere computer automation of existing processes.

—Cloud System, Multi-Tenant, and Enterprise Embodiments—

In one embodiment, the present system is a computing/data processing system including an application or collection of distributed applications for enterprise organizations. The applications and computing system may be configured to operate with or be implemented as a cloud-based networking system, a software as a service (SaaS) architecture, or other type of networked computing solution. For example, the applications and computing system may be implemented as a component or module of a cloud-based operations management system, such as Oracle® Netsuite®. In one embodiment the present system is a centralized server-side application that provides at least the functions disclosed herein and that is accessed by many users via computing devices/terminals communicating with the computing system (functioning as the server) over a computer network.

Figure 12:
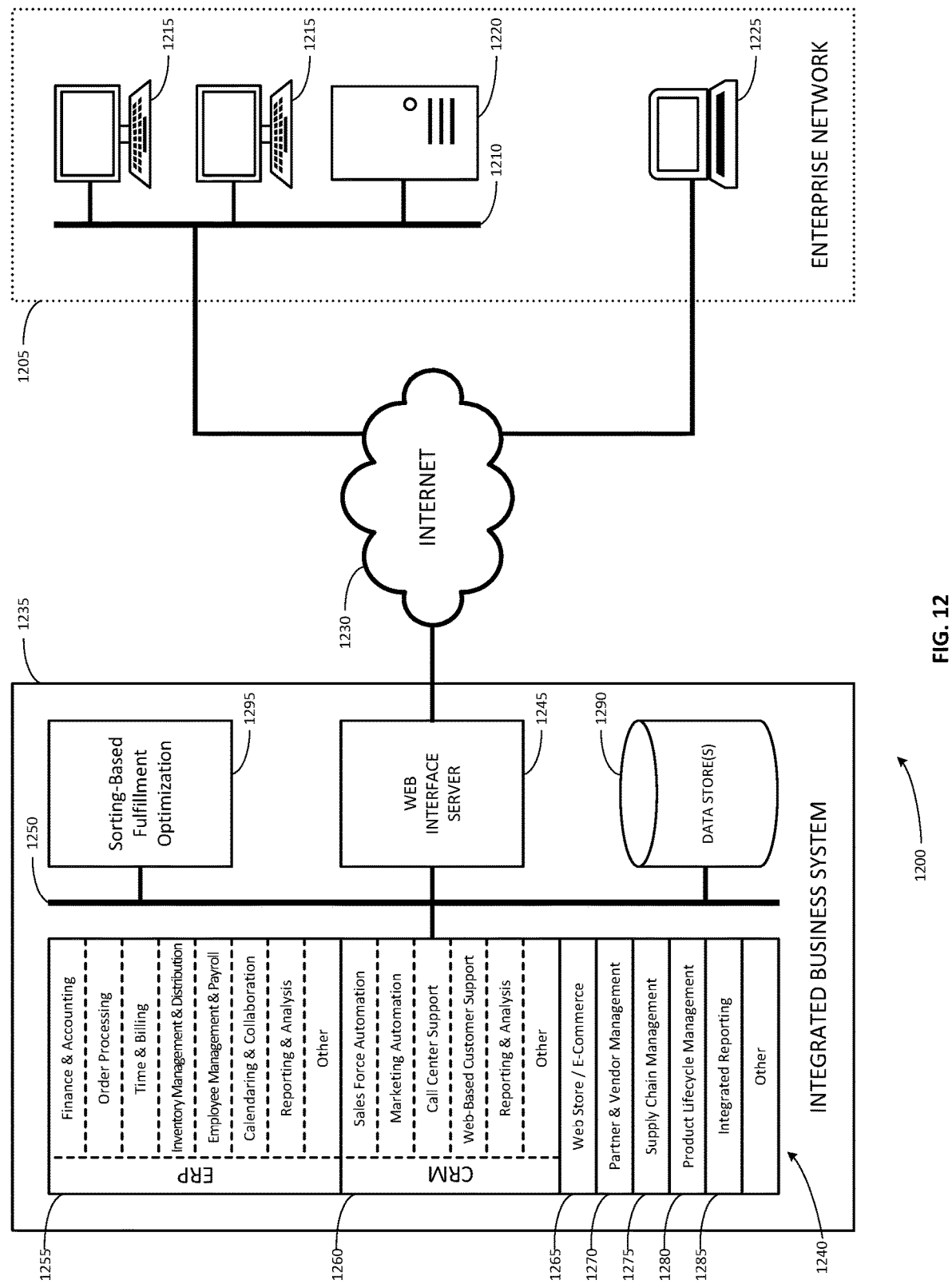
FIG. 12 illustrates one embodiment of a multi-tenant system associated with sorting-based assignment to optimize order fulfillment in short supply situations when available supply is insufficient to meet all scheduled demands.

FIG. 12 illustrates one embodiment of a multi-tenant system associated with sorting-based assignment to optimize order fulfillment in short supply situations when available supply is insufficient to meet all scheduled demands. Enterprise network 1205 may be associated with a business, such as a retailer, merchant, service provider, or other type of business. Alternatively, and in accordance with the advantages of an application service provider (ASP) hosted integrated financial analytics system (such as a multi-tenant data processing platform), the business may comprise fewer or no dedicated facilities or business network at all, provided that its end users have access to an internet browser and an internet connection. For simplicity and clarity of explanation, the enterprise network 1205 is represented by an on-site local area network 1210 to which one or more personal computers 1215, or servers 1220 are operably connected, along with one or more remote user computers 1225 that are connected to the enterprise network 1205 through the Internet 1230 or other suitable communications network or combination of networks. Each personal computer 1215 is generally dedicated to a particular end user, such as a service agent or other employee associated with the business, although such dedication is not required. The remote user computers 1225 may similarly be dedicated to a particular end user associated with the business. The personal computers 1215 and remote user computers 1225 can be, for example, a desktop computer, laptop computer, tablet computer, smartphone, or other device having the ability to connect to local area network 1210 or Internet 1230 or having other synchronization capabilities. Computing devices of the enterprise network 1205 interface with integrated business system 1235 across the Internet 1230 or another suitable communications network or combination of networks.

Integrated business system 1235, which may be hosted by a dedicated third party, may include an integrated business server 1240 and a web interface server 1245, operably connected by a network 1250. In some embodiments, either or both of the integrated business server 1240 and the web interface server 1245 may be implemented on one or more different hardware systems and components, even though represented as single units in FIG. 12.

One example of an integrated business system 1235 is the Oracle® NETSUITE® cloud business management software suite. NETSUITE® and other integrated business systems (such as Intacct, SAP, Sage, Microsoft® Dynamics) may be improved by incorporating the claimed systems and methods.

In one example configuration, integrated business system 1235 is operated by a third party for the benefit of multiple account owners/tenants, each of whom is operating a business, and each of whom has an associated enterprise network 1205.

In one example configuration, integrated business server 1240 includes various modules, which may include, for example any one or more of an enterprise resource planning (ERP) module 1255, a customer relationship management (CRM) module 1260, a web store/e-commerce module 1265, a partner and vendor management module 1270, a supply chain management (SCM) module 1275, a product lifecycle management (PLM) module 1280, and an integrated reporting module 1285. The ERP module 1255 may include, but is not limited to, a finance and accounting module, an order processing module, a time and billing module, an inventory management and distribution module, an employee management and payroll module, a calendaring and collaboration module, a reporting and analysis module, and other ERP-related modules (such as retail point of sale (POS), product information management (PIM), demand/material requirements planning (MRP), and purchasing modules). The CRM module 1260 may include, but is not limited to, a sales force automation (SFA) module, a marketing automation module, a contact list module (not shown), a call center support module, a web-based customer support module, a reporting and analysis module, and other CRM-related modules (such as contact list, returns management authorization (RMA), and loyalty program support modules). Other modules may also be included, for example, content management system (CMS) and human resources management modules. Further, integrated business server 1240 may further include user administration modules for governing the access of tenants and users to the integrated business system 1235.

In many cases, it will be desirable for the one of the above modules 1255-1285 to share methods, libraries, databases, subroutines, variables, etc., with one or more other of the above modules 1255-1285. For example, ERP module 1255 may be intertwined with CRM module 1260 into an integrated Business Data Processing Platform (which may be single tenant or multi-tenant).

Web interface server 1245 is configured and adapted to interface with the integrated business server 1240 to provide one or more web-based user interfaces to end users of the enterprise network 1205.

Integrated business system 1235 may further include data store(s) 1290 operably connected to integrated business server 1240 and web interface server 1245 by network 1250. In some embodiments, any or all of the integrated business system 1235 the web interface server 1245, and the data store(s) 1290 may be implemented on one or more different hardware systems and components, even though represented as single units in FIG. 12. In some example configurations, data store(s) 1290 may be implemented using a network-attached storage (NAS) device or other dedicated server device.

In one embodiment, a sorting-based fulfillment optimization server or module 1295 may be included in the integrated business system 1235. sorting-based fulfillment optimization server or module 1295 is configured and adapted to interface with the integrated business server 140, web interface server 145, and data store(s) 1290 through network 1250. Sorting-based fulfillment optimization server or module 1295 may operate to enhance order fulfillment software operations by minimizing unmet demands when available supply is insufficient to meet all scheduled demands, and to generate graphical user interfaces that act as tools for manipulating the minimization processes.

The integrated business system 1235 shown in FIG. 12 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service(s) that a server offers it could be referred to as a database server, data storage server, file server, mail server, print server, web server, etc. A web server may be a combination of hardware and the software that delivers content, commonly by hosting a website, to client web browsers that access the web server via the Internet. In one example, web interface server 1245 includes a web server.

Figure 13:
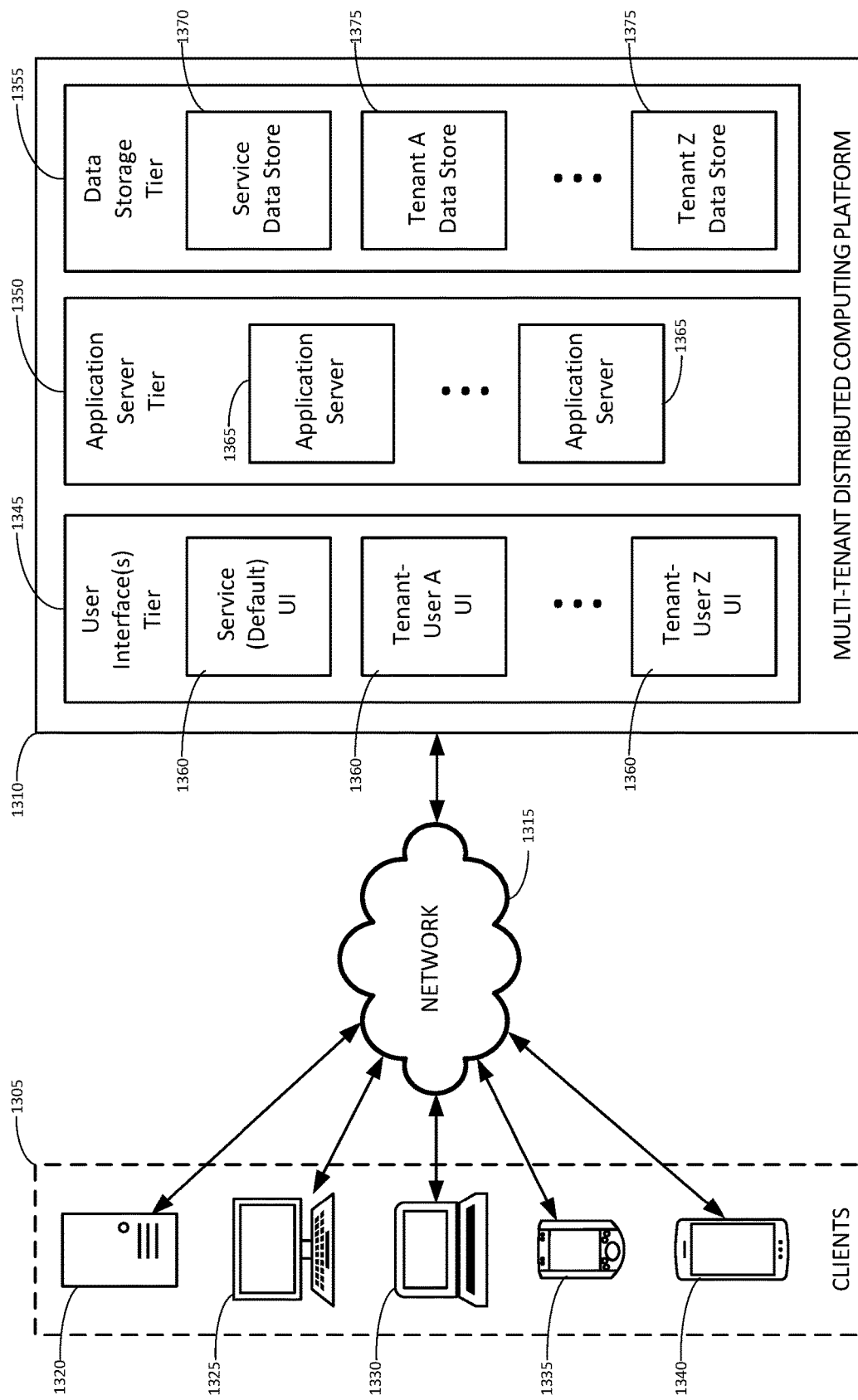
FIG. 13 is a diagram illustrating elements or components of an example operating environment in which an embodiment of the invention may be implemented.

FIG. 13 is a diagram illustrating elements or components of an example operating environment 1300 in which an embodiment of the invention may be implemented. The software architecture depicted in FIG. 13 represents a simplified example of a complex software system to which an embodiment of the invention may be applied.

As shown, a variety of clients 1305 incorporating and/or incorporated into a variety of computing devices may communicate with a distributed computing service/platform 1310 through one or more networks 1315. For example, a client may incorporate and/or be incorporated into a client application implemented by one or more of the computing devices. Examples of suitable clients include web browsers and dedicated client software applications. Examples of suitable computing devices include server computers 1320, personal computers such as desktop computers 1325 and laptop or notebook computers 1330, tablet computers or personal digital assistants (PDAs) 1335, cell phones or smart phones 1340, and other electronic devices incorporating one or more computing device components, such as one or more electronic processors, microprocessors, central processing units (CPU), or controllers. Examples of suitable networks 1315 include networks utilizing wired and/or wireless communication technologies and networks operating in accordance with any suitable networking and/or communication protocol (e.g., the Internet).

In one embodiment, distributed computing service/platform 1310 may be a multi-tenant business data processing platform. In this configuration, service platform 1310 may be operated by an entity in order to provide multiple tenants with a set of business-related applications, data storage, and functionality. These applications and functionality may include ones that a business uses to manage various aspects of its operations. For example, the applications and functionality may include providing web-based access to business information systems, thereby allowing a user with a browser and an Internet or other network 1315 connection to view, enter, process, or modify certain types of business information.

The distributed computing service/platform 1310 may include multiple processing tiers, including a user interface tier 1345, an application server tier 1350, and a data storage tier 1355. Each processing tier shown in the figure may be implemented with a set of computers and/or computer components including a processor accessing memory, and may perform various functions, methods, processes, or operations as determined by the execution of a software application or set of instructions.

The user interface tier 1345 may maintain multiple user interfaces 1360, including graphical user interfaces and/or web-based interfaces. The user interfaces may include a default user interface for the service to provide access to applications and data for a user or "tenant" of the service (depicted as "Service (Default) UI" in the figure), as well as one or more user interfaces that have been specialized/customized in accordance with user specific requirements (represented by "Tenant-User A UI" . . . "Tenant-User Z UI" in the figure, and which may be accessed via one or more APIs). The default user interface may include components enabling a tenant to administer the tenant's participation in the functions and capabilities provided by the service platform, such as accessing data, causing the execution of specific data processing operations, etc., although not all users will necessarily have permission to view these components.

The application server tier 1350 provides the framework of software to implement the functions or business applications of integrated business server 1140. Such functions or business applications are typically implemented by one or more modules of software code/instructions that are maintained on and executed by one or more application servers 1365 that are part of the platform's application server tier 1350.

The data storage tier 1355 may include one or more data stores, which may include a Service Data store 1370 and one or more Tenant Data stores 1375 (represented by "Tenant A Datastore" . . . "Tenant Z Datastore" in the figure). In one example, these data stores may be included in data store 1190. Each tenant data store 1375 may contain tenant-specific data that is used as part of providing a range of tenant-specific business services or functions, including but not limited to the to the functions or business applications of integrated business server 1140, such as ERP, CRM, etc. Data stores may be implemented with any suitable data storage technology, including structured query language (SQL) based relational database management systems (RDBMS).

Figure 14:
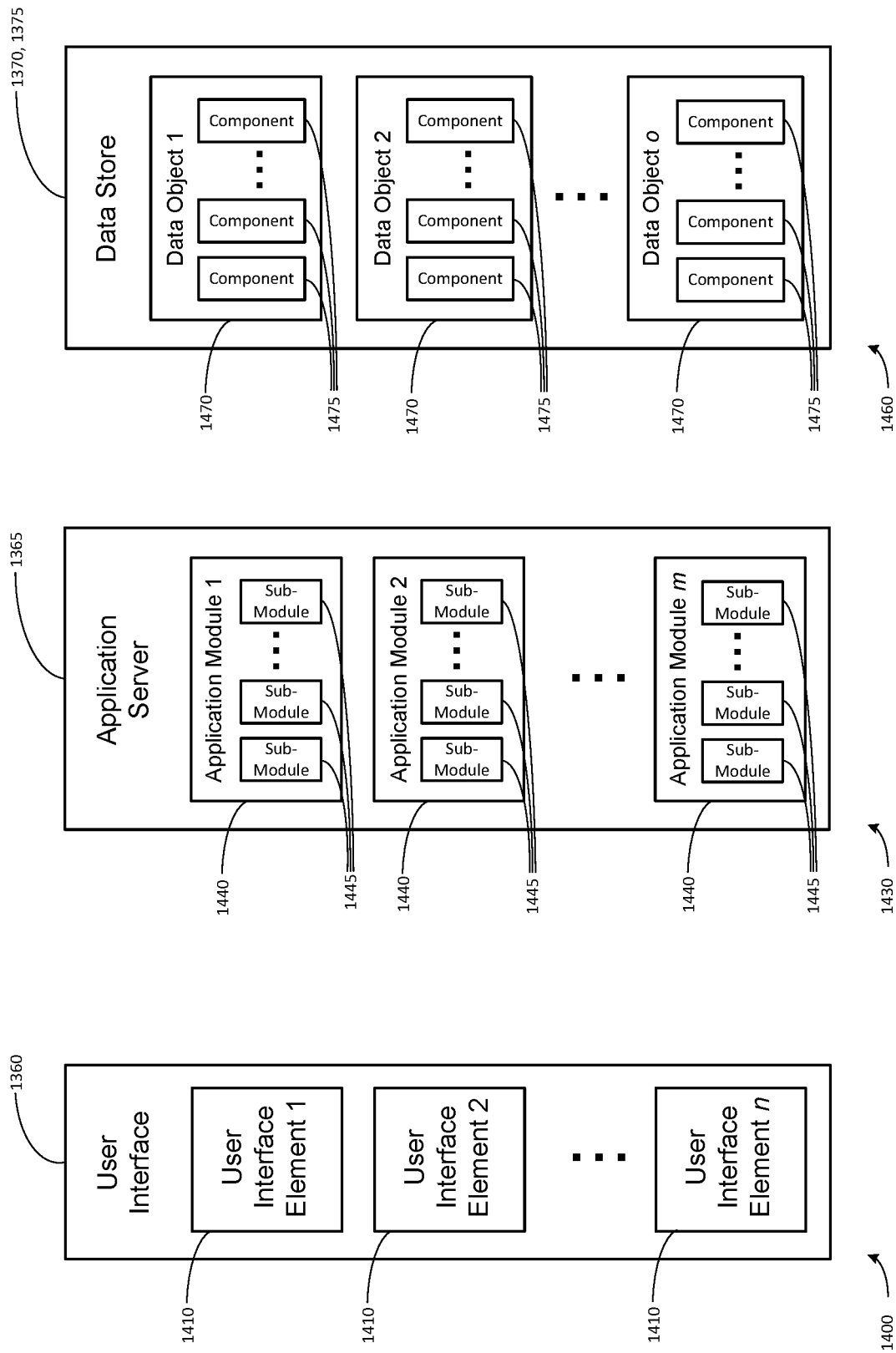
FIG. 14A is a diagram illustrating additional details of the elements or components of the user interface first presented with reference to FIG. 13.
FIG. 14B is a diagram illustrating additional details of the elements or components of the application server first presented with reference to FIG. 13.
FIG. 14C is a diagram illustrating additional details of the elements or components of the data store first presented with reference to FIG. 13.

FIG. 14A is a diagram illustrating additional details of the elements or components of the user interface 1360 first presented with reference to FIG. 13. For purposes of this document, user interfaces 1360 include graphical user interfaces (GUIs) and command line interfaces (CLIs), as well as application programming interfaces (APIs) by which programs may access and use the integrated business systems. Each user interface 1360 may include one or more interface elements 1410 (represented by "User Interface Element 1" . . . "User Interface Element n" in the figure). For example, users may interact with interface elements in order to access functionality and/or data provided by application and/or data storage layers of the example architecture. Graphical user interfaces may be local or remote. Examples of graphical user interface elements include buttons, radio buttons, menus, checkboxes, drop-down lists, scrollbars, sliders, spinners, text boxes, icons, labels, progress bars, status bars, toolbars, windows, hyperlinks, and dialog boxes. Graphical user interface elements may be manipulated by mouse clicks, mouse drag-and-drops, or other operations of cursor controller 1582 or text input devices 1580. Application programming interfaces may be local or remote. Examples of application programming interface elements include parameterized procedure calls, programmatic objects, and messaging protocols.

FIG. 14B is a diagram illustrating additional details of the elements or components of the application server 1365 first presented with reference to FIG. 13. Application server 1365 may include one or more application modules 1440 (represented by "Application Module 1" . . . "Application Module 1 m" in the figure), each of which may have one or more sub-modules 1445. Each application module 1440 or sub-module 1445 may correspond to a particular function, method, process, or operation that is implemented by the module or sub-module (e.g., a function or process related to providing ERP, CRM, eCommerce or another functionality to a user of the platform). Each application server 1365 may include each application module. Alternatively, different application servers 1365 may include different sets of application modules. Such sets may be disjoint or overlapping.

FIG. 14C is a diagram illustrating additional details of the elements or components of the data store 1370, 1375 first presented with reference to FIG. 13. Each data store 1370, 1375 may include one or more data objects 1470 each having one or more data object components 1475, such as attributes and/or behaviors. For example, the data store 1370, 1375 may correspond to a relational database, the data objects 1470 may correspond to tables of the relational database, and the data object components 1475 may correspond to columns or fields of such tables. Alternatively, or in addition, the data objects may correspond to data records having fields and associated services. Alternatively, or in addition, the data objects may correspond to persistent instances of programmatic data objects, such as structures and classes. Alternatively, or in addition, the data store 1370, 1375, data objects 1470, and data object components 1475 may each be any form of data structure as described herein. Each data store in the data storage layer may include each data object. Alternatively, different data stores may include different sets of data objects. Such sets may be disjoint or overlapping.

—Software Module Embodiments—

In general, software instructions are designed to be executed by a suitably programmed processor. These software instructions may include, for example, computer-executable code and source code that may be compiled into computer-executable code. These software instructions may also include instructions written in an interpreted programming language, such as a scripting language.

In a complex system, such instructions are typically arranged into program modules with each such module performing a specific task, process, function, or operation. The entire set of modules may be controlled or coordinated in their operation by an operating system (OS) or other form of organizational platform.

In one embodiment, one or more of the components, functions, methods, or processes described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 15:
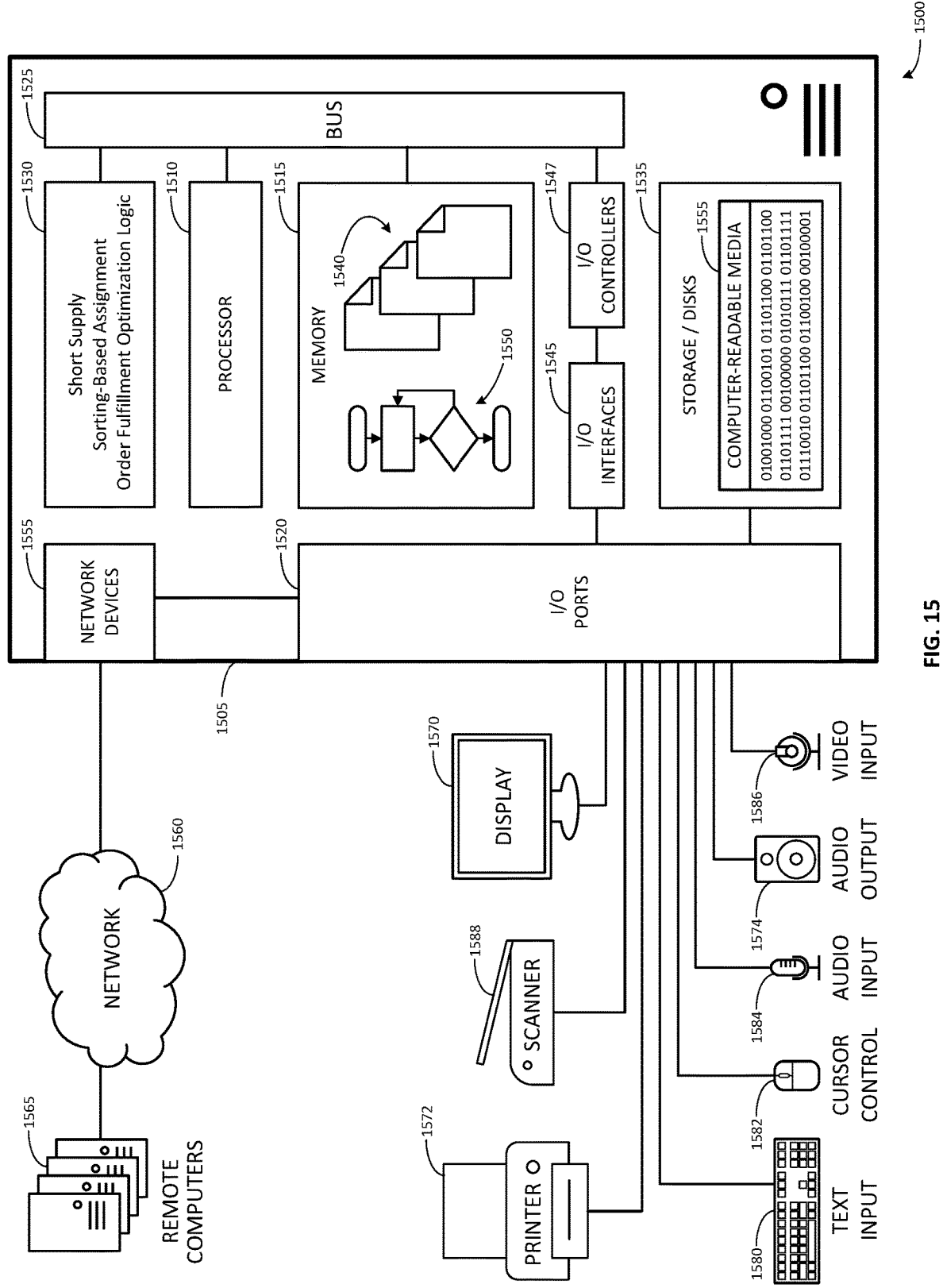
FIG. 15 illustrates an example computing device that is configured and/or programmed with one or more of the example systems and methods described herein, and/or equivalents.

FIG. 15 illustrates an example computing device that is configured and/or programmed with one or more of the example systems and methods described herein, and/or equivalents. The example computing device may be a computer 1505 that includes a processor 1510, a memory 1515, and input/output ports 1520 operably connected by a bus 1525. In one example, the computer 1505 may include short supply sorting-based assignment order fulfillment optimization logic 1530 configured to facilitate sorting-based order fulfillment optimization when available supply is insufficient to meet all scheduled demands, similar to the logic, systems, and methods shown and described with reference to FIGS. 1-11. In different examples, the logic 1530 may be implemented in hardware, a non-transitory computer-readable medium with stored instructions, firmware, and/or combinations thereof. While the logic 1530 is illustrated as a hardware component attached to the bus 1525, it is to be appreciated that in other embodiments, the logic 1530 could be implemented in the processor 1510, stored in memory 1515, or stored in disk 1535.

In one embodiment, logic 1530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to automate process discovery and facilitation. The means may also be implemented as stored computer executable instructions that are presented to computer 1505 as data 1540 that are temporarily stored in memory 1515 and then executed by processor 1510.

Logic 1530 may also provide means (e.g., hardware, non-transitory computer-readable medium that stores executable instructions, firmware) for performing automated process discovery and facilitation.

Generally describing an example configuration of the computer 1505, the processor 1510 may be a variety of various processors including dual microprocessor and other multi-processor architectures. A memory 1515 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1535 may be operably connected to the computer 1505 via, for example, an input/output interface (e.g., card, device) 1545 and an input/output port 1520 that are controlled by at least an input/output (I/O) controller 1547. The disk 1535 may be, for example, a magnetic disk drive, a solid-state disk drive, a floppy disk drive, a tape drive, a Zip drive, a flash memory card, a memory stick, and so on. Furthermore, the disk 1535 may be a CD-ROM drive, a CD-R drive, a CD-RW drive, a DVD ROM, and so on. The memory 1515 can store a process 1550 and/or a data 1540, for example. The disk 1535 and/or the memory 1515 can store an operating system that controls and allocates resources of the computer 1505.

The computer 1505 may interact with input/output devices by way of the input/output (I/O) controller 1547, the input/output (I/O) interfaces 1545 and the input/output ports 1520. Input/output devices may be, for example, a keyboard, a microphone, a pointing and selection device, cameras, video cards, displays, the disk 1535, the network devices 1555, and so on. The input/output ports 1520 may include, for example, serial ports, parallel ports, and USB ports.

The computer 1505 can operate in a network environment and thus may be connected to the network devices 1555 via the I/O interfaces 1545, and/or the I/O ports 1520. Through the network devices 1555, the computer 1505 may interact with a network 1560. Through the network 1560, the computer 1505 may be logically connected to remote computers 1565. Networks with which the computer 1505 may interact include, but are not limited to, a LAN, a WAN, and other networks.

The computer 1505 can control one or more output devices, or be controlled by one or more input devices, through I/O ports 1520. The output devices include one or more displays 1570, printers 1572 (such as inkjet, laser, or 3D printers), and audio output devices 1574 (such as speakers or headphones). The input devices include one or more text input devices 1580 (such as keyboards), cursor controllers 1582 (such as mice, touchpads, or touch screens), audio input devices 1584 (such as microphones), and video input devices 1586 (such as video and still cameras).

—Definitions and Other Embodiments—

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
USB: universal serial bus.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer implemented method, comprising:
automatically arranging a graphical representation of a schedule of supplies and met and unmet demands for a series of days in a graphical user interface;
accepting a user input through the graphical user interface to cause the schedule of supplies and met and unmet demands for the series of days to be regenerated;
identifying a set of one or more distributions within the series of days;
sorting all demands of a first priority level occurring in the series of days by ascending order of size of the demand;
for the demands of the first priority level in sorted order, selecting an initial distribution during which the demand is scheduled to be fulfilled from the set of distributions,
for the demands of the first priority level in sorted order, generating, by a processor, (i) an indication that one of the demands can be completely fulfilled, and (ii) an indication that another of the demands cannot be fulfilled and is to be left entirely unmet, based on sizes of the demands and amount of supply available for assignment in the initial distribution and all previous distributions preceding the initial distribution; and
automatically rearranging the graphical representation of the schedule of supplies and met and unmet demands for the series of days in the graphical user interface based at least on the indications generated for each demand.

2. The method of claim 1, wherein generating the indications for each demand further comprises:
while (i) a unit quantity of unassigned units for the demand remain, and (ii) a current distribution under consideration remains unevaluated among the initial distribution and the previous distributions,
(a) selecting as a least quantity one of (i) a supply quantity available for assignment from the current distribution and (ii) the unit quantity,
(b) reducing both the supply quantity and the unit quantity by the least quantity,
(c) inserting the current distribution and the least quantity into an assignment map, and
(d) in response to the supply quantity being completely exhausted, setting the current distribution to be a previous distribution immediately preceding the current distribution;
determining whether unassigned units remain for the demand; and
in response to a determination
(i) that unassigned units for the demand remain, removing the least quantities stored in the assignment map and adding the least quantities to the supply quantities of the respective distributions, and generating the indication that the demand cannot be fulfilled; and
(ii) that unassigned units for the demand do not remain, generating the indication that the demand can be completely fulfilled, and retaining the assignment map, wherein the assignment map indicates source distributions and quantities for all supply assigned to the demand.

3. The method of claim 1, further comprising:
sorting all demands of a second priority level occurring in the series of days by ascending order of size of the demand;
for the sorted demands of each priority level, further sorting each group of multiple demands of equal size in descending order of ship date;
wherein (i) the selection of an initial distribution and (ii) the generation of an indication of whether the demand can be filled are further performed for each demand of the second priority level in sorted order; and
wherein the demands of the second priority level are included in the graphical representation of the schedule.

4. The method of claim 1, further comprising:
for each demand that is completely fulfilled, retrieving an assignment map that indicates source distributions and quantities for all supply assigned to the demand; and
transmitting an instruction to fulfill or leave unfulfilled the individual demands over the series of days in accordance with the assignment maps and the schedule.

5. The method of claim 1, further comprising:
accepting an additional input that indicates a change to the schedule;
automatically re-generating the schedule of supplies and met and unmet demands by initiating
(i) the identification of the distributions,
(ii) the sorting of all demands, and
(iii) the selection of an initial distribution and generation of an indication of whether the demand can be filled for each demand
in response to the acceptance of the additional input; and
automatically re-arranging the graphical representation of the schedule based on the re-generated schedule to display the effect of the change;
wherein the indication of a change to the schedule is selected from the group consisting of (i) an indication that that a particular demand is required to be met, (ii) an indication that a particular demand is required to be unmet, (iii) an indication that a particular demand or supply is moved from one day to another, (iv) an indication that that a particular demand is moved from one priority level to another, (v) an indication that a particular demand or supply is deleted, and (vi) a set of one or more inputs that describe addition of a new demand or supply.

6. The method of claim 1, wherein a distribution is more than one consecutive days in which supply arrives on a first day of the more than one consecutive days and not on days subsequent to the first day of the distribution.

7. The method of claim 1, further comprising:
accessing the indications generated for each demand as a first optimal solution;
generating a mapping between each set of demands of equal size in the demands and a number of demands that are met for the set of demands of equal size in the first optimal solution;
for each set of equal sized demands, generating all alternative sets of met demands that meet the same number of demands;
determining each permutation of selecting one set of met demands for each of the demand sizes to create a list of candidate solutions; and
removing each permutation that cannot be met by available supply to create a list of equivalently optimal solutions from the list of candidate solutions.

8. A non-transitory computer-readable medium that includes stored thereon computer-executable instructions that when executed by at least a processor of a computer cause the computer to:
- automatically arrange a graphical representation of a schedule of supplies and met and unmet demands for a series of days in a graphical user interface;
- accept a user input through the graphical user interface to cause the schedule of supplies and met and unmet demands for the series of days to be generated;
- identify, by at least the processor, a set of one or more distributions within the series of days;
- sort, by at least the processor, all demands of a first priority level occurring in the series of days by ascending order of size of the demand;
- for the demands of the first priority level in sorted order, select, by at least the processor, an initial distribution during which the demand is scheduled to be fulfilled from the set of distributions,
- for the demands of the first priority level in sorted order, generate, by at least the processor, (i) an indication that one of the demands can be completely fulfilled, and (ii) an indication that another of the demands cannot be fulfilled and is to be left entirely unmet, based on sizes of the demands and amount of supply available for assignment in the initial distribution and all previous distributions preceding the initial distribution; and
- automatically rearrange, by at least the processor, the graphical representation of the schedule of supplies and met and unmet demands for the series of days in the graphical user interface based at least on the indications generated for each demand.

9. The non-transitory computer-readable medium of claim 8, wherein the instructions for generating the indications for each demand further comprise instructions that when executed by at least the processor cause the computer to:
- while (i) a unit quantity of unassigned units for the demand remain, and (ii) a current distribution under consideration remains unevaluated among the initial distribution and the previous distributions,
  - (a) select, by at least the processor, as a least quantity one of (i) a supply quantity available for assignment from the current distribution and (ii) the unit quantity,
  - (b) reduce, by at least the processor, both the supply quantity and the unit quantity by the least quantity,
  - (c) insert, by at least the processor, the current distribution and the least quantity into an assignment map, and
  - (d) in response to the supply quantity being completely exhausted, set, by at least the processor, the current distribution to be a previous distribution immediately preceding the current distribution;
- determine, by at least the processor, whether unassigned units remain for the demand; and
- in response to a determination
  - (i) that unassigned units for the demand remain, remove, by at least the processor, the least quantities stored in the assignment map and add the least quantities to the supply quantities of the respective distributions, and generate, by at least the processor, the indication that the demand cannot be fulfilled; and
  - (ii) that unassigned units for the demand do not remain, generate, by at least the processor, the indication that the demand can be completely fulfilled, and retain the assignment map, wherein the assignment map indicates source distributions and quantities for all supply assigned to the demand.

10. The non-transitory computer-readable medium of claim 8, further comprising instructions that when executed by at least the processor cause the computer to:
- sort, by at least the processor, all demands of a second priority level occurring in the series of days by ascending order of size of the demand;
- for the sorted demands of each priority level, further sort, by at least the processor, each group of multiple demands of equal size in descending order of ship date;
- wherein (i) the selection of an initial distribution and (ii) the generation of an indication of whether the demand can be filled are further performed for each demand of the second priority level in sorted order; and
- wherein the demands of the second priority level are included in the graphical representation of the schedule.

11. The non-transitory computer-readable medium of claim 8, further comprising instructions that when executed by at least the processor cause the computer to:
- for each demand that is completely fulfilled, retrieve an assignment map that indicates source distributions and quantities for all supply assigned to the demand; and
- transmit an instruction to fulfill or leave unfulfilled the individual demands over the series of days in accordance with the assignment maps and the schedule.

12. The non-transitory computer-readable medium of claim 8, further comprising instructions that when executed by at least the processor cause the computer to:
- accept an additional input through the graphical user interface that indicates a change to the schedule;
- automatically re-generate the schedule of supplies and met and unmet demands by initiating
  - (i) the identification of the distributions,
  - (ii) the sorting of all demands, and
  - (iii) the selection of an initial distribution and generation of an indication of whether the demand can be filled for each demand
  in response to the acceptance of the additional input; and
- automatically re-arrange the graphical representation of the schedule based on the re-generated schedule to display the effect of the change;
- wherein the graphical user interface is configured to accept inputs that indicate a change to the schedule including each of (i) an indication that that a particular demand is required to be met, (ii) an indication that a particular demand is required to be unmet, (iii) an indication that a particular demand or supply is moved from one day to another, (iv) an indication that that a particular demand is moved from one priority level to another, (v) an indication that a particular demand or supply is deleted, and (vi) inputs that describe addition of a new demand or supply.

13. The non-transitory computer-readable medium of claim 8, further comprising instructions that when executed by at least the processor cause the computer to:
- in response to an input that indicates that a particular demand is required to be met, filling the particular demand first before filling other demands; and
- in response to an input that indicates that the particular demand is required to be unmet, filtering the particular demand out of all demands occurring in the series of days.

14. The non-transitory computer-readable medium of claim 8, further comprising instructions that when executed by at least the processor cause the computer to:
  access, by at least the processor, the indications generated for each demand as a first optimal solution;
  generate, by at least the processor, a mapping between each set of demands of equal size in the demands and a number of demands that are met for the set of demands of equal size in the first optimal solution;
  for each set of equal sized demands, generate, by at least the processor, all alternative sets of met demands that meet the same number of demands;
  determine, by at least the processor, each permutation of selecting one set of met demands for each of the demand sizes to create a list of candidate solutions; and
  remove, by at least the processor, each permutation that cannot be met by available supply to create a list of equivalently optimal solutions from the list of candidate solutions.

15. A computing system, comprising:
  a processor;
  a memory operably connected to the processor;
  a non-transitory computer-readable medium operably connected to the processor and memory and storing computer-executable instructions that when executed by at least a processor of a computer cause the computer to:
    automatically arrange a graphical representation of a schedule of supplies and met and unmet demands for a series of days in a graphical user interface;
    accept a user input through the graphical user interface to cause the schedule of supplies and met and unmet demands for the series of days to be generated;
    identify, by at least the processor, a set of one or more distributions within the series of days;
    sort, by at least the processor, all demands of a first priority level occurring in the series of days by ascending order of size of the demand;
    for the demands of the first priority level in sorted order, select, by at least the processor, an initial distribution during which the demand is scheduled to be fulfilled from the set of distributions,
    for the demands of the first priority level in sorted order generate, by at least the processor, (i) an indication that one of the demands can be completely fulfilled, and (ii) an indication that another of the demands cannot be fulfilled and is to be left entirely unmet, based on size of the demand and amount of supply available for assignment in the initial distribution and all previous distributions preceding the initial distribution; and
    automatically rearrange, by at least the processor, the graphical representation of the schedule of supplies and met and unmet demands for the series of days in the graphical user interface based at least on the indications generated for each demand.

16. The computing system of claim 15, wherein the non-transitory computer-readable medium further comprises instructions that when executed by at least the processor cause the computing system to:
  while (i) a unit quantity of unassigned units for the demand remain, and (ii) a current distribution under consideration remains unevaluated among the initial distribution and the previous distributions,
    (a) select as a least quantity one of (i) a supply quantity available for assignment from the current distribution and (ii) the unit quantity,
    (b) reduce both the supply quantity and the unit quantity by the least quantity,
    (c) insert the current distribution and the least quantity into an assignment map, and
    (d) in response to the supply quantity being completely exhausted, set the current distribution to be a previous distribution immediately preceding the current distribution;
  determine whether unassigned units remain for the demand; and
  in response to a determination
    (i) that unassigned units for the demand remain, remove the least quantities stored in the assignment map and add the least quantities to the supply quantities of the respective distributions, and generate the indication that the demand cannot be fulfilled; and
    (ii) that unassigned units for the demand do not remain, generate the indication that the demand can be completely fulfilled, and retain the assignment map, wherein the assignment map indicates source distributions and quantities for all supply assigned to the demand.

17. The computing system of claim 15, wherein the non-transitory computer-readable medium further comprises instructions that when executed by at least the processor cause the computing system to:
  sort all demands of a second priority level occurring in the series of days by ascending order of size of the demand;
  for the sorted demands of each priority level, further sort each group of multiple demands of equal size in descending order of ship date;
  wherein (i) the selection of an initial distribution and (ii) the generation of an indication of whether the demand can be filled are further performed for each demand of the second priority level in sorted order; and
  wherein the demands of the second priority level are included in the graphical representation of the schedule.

18. The computing system of claim 15, wherein the non-transitory computer-readable medium further comprises instructions that when executed by at least the processor cause the computing system to:
  accept an input through the graphical user interface that indicates a change to the schedule;
  automatically re-generate the schedule of supplies and met and unmet demands by initiating (i) the identification of the distributions, (ii) the sorting of all demands, (iii) the selection of an initial distribution and generation of an indication of whether the demand can be filled for each demand, in response to the acceptance of the input; and
  automatically re-arrange the graphical representation of the schedule based on the re-generated schedule to display the effect of the change;
  wherein the graphical user interface is configured to accept inputs that indicate a change to the schedule including one or more of (i) an indication that that a particular demand is required to be met, (ii) an indication that a particular demand is required to be unmet, (iii) an indication that a particular demand or supply is moved from one day to another, (iv) an indication that that a particular demand is moved from one priority level to another, (v) an indication that a particular demand or supply is deleted, and (vi) inputs that describe addition of a new demand or supply.

19. The computing system of claim 15, wherein the non-transitory computer-readable medium further comprises instructions that when executed by at least the processor cause the computing system to:
- in response to an input that indicates that a particular demand is required to be met, filling the particular demand first before filling other demands; and
- in response to an input that indicates that the particular demand is required to be unmet, filtering the particular demand out of all demands occurring in the series of days.

20. The computing system of claim 15, wherein the non-transitory computer-readable medium further comprises instructions that when executed by at least the processor cause the computing system to:
- access, by at least the processor, the indications generated for each demand as a first optimal solution;
- generate, by at least the processor, a mapping between each set of demands of equal size in the demands and a number of demands that are met for the set of demands of equal size in the first optimal solution;
- for each set of equal sized demands, generate, by at least the processor, all alternative sets of met demands that meet the same number of demands;
- determine, by at least the processor, each permutation of selecting one set of met demands for each of the demand sizes to create a list of candidate solutions; and
- remove, by at least the processor, each permutation that cannot be met by available supply to create a list of equivalently optimal solutions from the list of candidate solutions.

* * * * *

UNITED STATES PATENT AND TRADEMARK OFFICE
CERTIFICATE OF CORRECTION

PATENT NO. : 11,966,868 B2
APPLICATION NO. : 16/879219
DATED : April 23, 2024
INVENTOR(S) : Long et al.

It is certified that error appears in the above-identified patent and that said Letters Patent is hereby corrected as shown below:

On the Title Page

Column 2, under item (57) Abstract, Line 10, delete "can cannot" and insert -- cannot --, therefor.

In the Specification

In Column 43, Line 59, delete "to the to the" and insert -- to the --, therefor.

In the Claims

In Column 50, Line 39, in Claim 5, delete "that that" and insert -- that --, therefor.

In Column 50, Line 43, in Claim 5, delete "that that" and insert -- that --, therefor.

In Column 52, Line 49, in Claim 12, delete "that that" and insert -- that --, therefor.

In Column 52, Line 53, in Claim 12, delete "that that" and insert -- that --, therefor.

In Column 54, Line 57, in Claim 18, delete "that that" and insert -- that --, therefor.

In Column 54, Line 61, in Claim 18, delete "indication that" and insert -- indication --, therefor.

Signed and Sealed this
Sixth Day of August, 2024

Katherine Kelly Vidal
*Director of the United States Patent and Trademark Office*